(12) United States Patent
Burky et al.

(10) Patent No.: US 10,597,972 B2
(45) Date of Patent: Mar. 24, 2020

(54) AUTONOMOUS PRESSURE CONTROL ASSEMBLY WITH STATE-CHANGING VALVE SYSTEM

(71) Applicant: HALLIBURTON ENERGY SERVICES, INC., Houston, TX (US)

(72) Inventors: Thomas Earl Burky, Mansfield, TX (US); Dennis J. Haggerty, Burleson, TX (US); James Marshall Barker, Mansfield, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 161 days.

(21) Appl. No.: 15/514,124

(22) PCT Filed: Dec. 1, 2016

(86) PCT No.: PCT/US2016/064330
§ 371 (c)(1),
(2) Date: Mar. 24, 2017

(87) PCT Pub. No.: WO2017/131856
PCT Pub. Date: Aug. 3, 2017

(65) Prior Publication Data
US 2018/0148995 A1    May 31, 2018

Related U.S. Application Data

(63) Continuation-in-part of application No. PCT/US2016/015089, filed on Jan. 27, 2016.

(51) Int. Cl.
*E21B 34/06* (2006.01)
*E21B 47/06* (2012.01)
(Continued)

(52) U.S. Cl.
CPC ............ *E21B 34/06* (2013.01); *E21B 43/117* (2013.01); *E21B 43/119* (2013.01); *E21B 47/06* (2013.01);
(Continued)

(58) Field of Classification Search
CPC .................. E21B 34/08; E21B 43/11
See application file for complete search history.

(56) References Cited

U.S. PATENT DOCUMENTS

| | | |
|---|---|---|
| 4,509,604 A | 4/1985 | Upchurch |
| 4,633,945 A | 1/1987 | Upchurch |

(Continued)

FOREIGN PATENT DOCUMENTS

| | | |
|---|---|---|
| CN | 2443145 B | 8/2001 |
| WO | 2014123510 A1 | 8/2014 |

(Continued)

OTHER PUBLICATIONS

International Search Report and Written Opinion issued by the Korean Intellectual Property Office regarding International Application No. PCT/US2016/015089, dated Oct. 18, 2016, 14 pages.

(Continued)

*Primary Examiner* — Robert E Fuller
*Assistant Examiner* — Theodore N Yao
(74) *Attorney, Agent, or Firm* — Haynes and Boone, LLP

(57) ABSTRACT

A method and apparatus are provided for controlling wellbore pressure within a wellbore during a perforation event by changing a state of a valve system multiple times. Information generated about the wellbore pressure within the wellbore may be received. A state of the valve system, which is positioned relative to a chamber within the wellbore, may be changed multiple times based on the information received to create a plurality of pressure conditions that substantially match a reference pressure profile. Each of the (Continued)

plurality of pressure conditions is selected from one of an underbalance condition and an overbalance condition.

16 Claims, 16 Drawing Sheets

(51) Int. Cl.
  *E21B 43/119* (2006.01)
  *E21B 43/117* (2006.01)
  *E21B 34/00* (2006.01)
  *F16K 31/00* (2006.01)
  *F15B 15/19* (2006.01)

(52) U.S. Cl.
  CPC ........ *F16K 31/00* (2013.01); *E21B 2034/007* (2013.01); *F15B 15/19* (2013.01)

(56) References Cited

U.S. PATENT DOCUMENTS

| | | | |
|---|---|---|---|
| 4,862,964 | A | 9/1989 | George et al. |
| 5,088,557 | A | 2/1992 | Ricles et al. |
| 6,021,377 | A | 2/2000 | Dubinsky et al. |
| 6,046,685 | A | 4/2000 | Tubel |
| 6,598,682 | B2 | 7/2003 | Johnson et al. |
| 6,732,798 | B2 | 5/2004 | Johnson et al. |
| 6,885,918 | B2 | 4/2005 | Harmon et al. |
| 7,036,594 | B2 | 5/2006 | Walton et al. |
| 7,121,340 | B2 | 10/2006 | Grove et al. |
| 7,147,059 | B2 | 12/2006 | Hirsch et al. |
| 7,222,022 | B2 | 5/2007 | Kneissl et al. |
| 7,278,480 | B2 | 10/2007 | Longfield et al. |
| 7,428,921 | B2 | 9/2008 | Grove et al. |
| 7,571,768 | B2 | 8/2009 | Cuthill |
| 7,905,285 | B2 | 3/2011 | Cuthill |
| 7,980,309 | B2 | 7/2011 | Crawford |
| 8,285,200 | B2 | 10/2012 | Backholm et al. |
| 8,302,688 | B2 | 11/2012 | Burleson et al. |
| 8,319,657 | B2 | 11/2012 | Godager |
| 8,336,437 | B2 | 12/2012 | Barlow et al. |
| 8,672,031 | B2 | 3/2014 | Vaynshteyn |
| 8,726,996 | B2 | 5/2014 | Busaidy et al. |
| 8,807,003 | B2 | 8/2014 | Le et al. |
| 8,899,320 | B2 | 12/2014 | Le et al. |
| 8,985,200 | B2 | 3/2015 | Rodgers et al. |
| 9,020,431 | B2 | 7/2015 | Bell et al. |
| 2004/0231840 | A1* | 11/2004 | Ratanasirigulchai ... E21B 21/00 166/259 |
| 2005/0247449 | A1 | 11/2005 | George et al. |
| 2009/0084552 | A1 | 4/2009 | Behrmann et al. |
| 2009/0272527 | A1* | 11/2009 | Cuthill ................ E21B 43/1195 166/250.01 |
| 2011/0132608 | A1 | 6/2011 | Busaidy et al. |
| 2012/0018156 | A1 | 1/2012 | Grove et al. |
| 2012/0037380 | A1* | 2/2012 | Arizmendi, Jr. ........ E21B 23/04 166/369 |
| 2012/0125627 | A1 | 5/2012 | George et al. |
| 2013/0008655 | A1 | 1/2013 | Le et al. |
| 2013/0220613 | A1 | 8/2013 | Brooks et al. |
| 2013/0327536 | A1 | 12/2013 | Alexander et al. |
| 2014/0216763 | A1 | 8/2014 | Kalb et al. |
| 2014/0299322 | A1 | 10/2014 | Underdown |
| 2015/0000509 | A1 | 1/2015 | Current et al. |
| 2015/0096752 | A1 | 4/2015 | Burgos et al. |
| 2015/0176374 | A1 | 6/2015 | Lagrange et al. |
| 2015/0285063 | A1 | 10/2015 | Purkis |

FOREIGN PATENT DOCUMENTS

| | | |
|---|---|---|
| WO | 2015060818 A1 | 4/2015 |
| WO | 2015099634 A1 | 7/2015 |

OTHER PUBLICATIONS

International Search Report and Written Opinion issued by the Korean Intellectual Property Office regarding International Application No. PCT/US2016/064330, dated Mar. 15, 2017, 15 pages.
Wu et al., Simultaneous Multifracture Treatments: Fully Coupled Fluid Flow and Fracture Mechanics for Horizontal Wells, Society of Petroleum Engineers, Apr. 2015 SPE Journal, pp. 337-346.
Chadha et al; A combination of Perforating Technologies to Maximize Well Productivity and Minimize Rig Time, Feb. 2, 2012, 10 pages.
Jumaat, Repeat Dynamic Underbalance Perforating in Oman, Dynamic Underbalance, Dec. 31, 2013, 7 pages.
Bakker et al., The New Dynamics of Underbalanced Perforating, Oilfield Review, Dec. 31, 2003, pp. 54-67.
International Preliminary Report on Patentability, International Application No. PCT/US2016/064330, dated Jul. 31, 2018, 11 pages.
Canadian Intellectual Property Office, Application No. 3012627, Examiner's Letter, dated May 22, 2019, 3 pages.

* cited by examiner

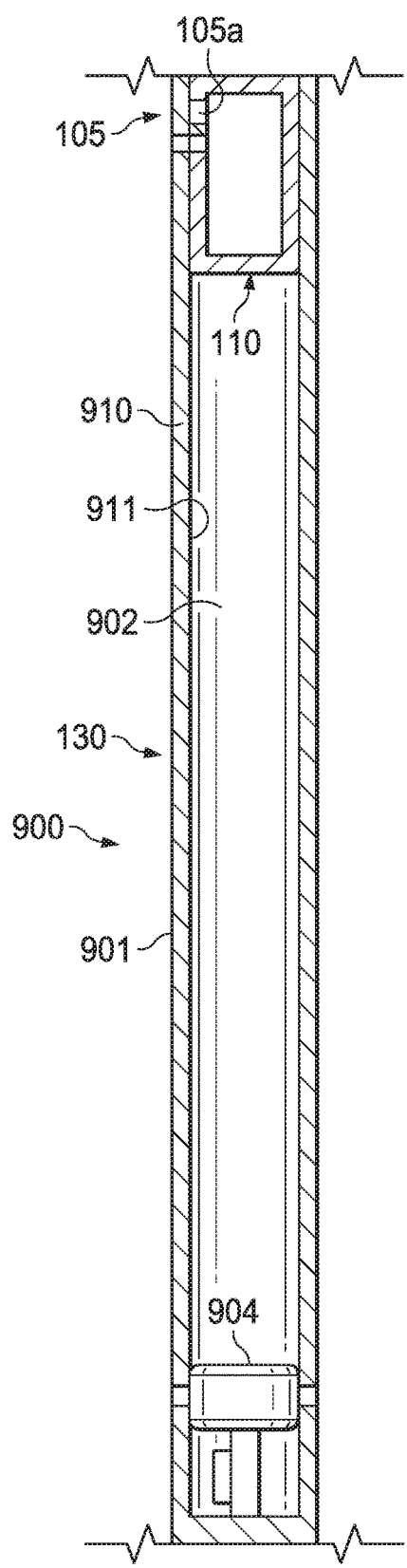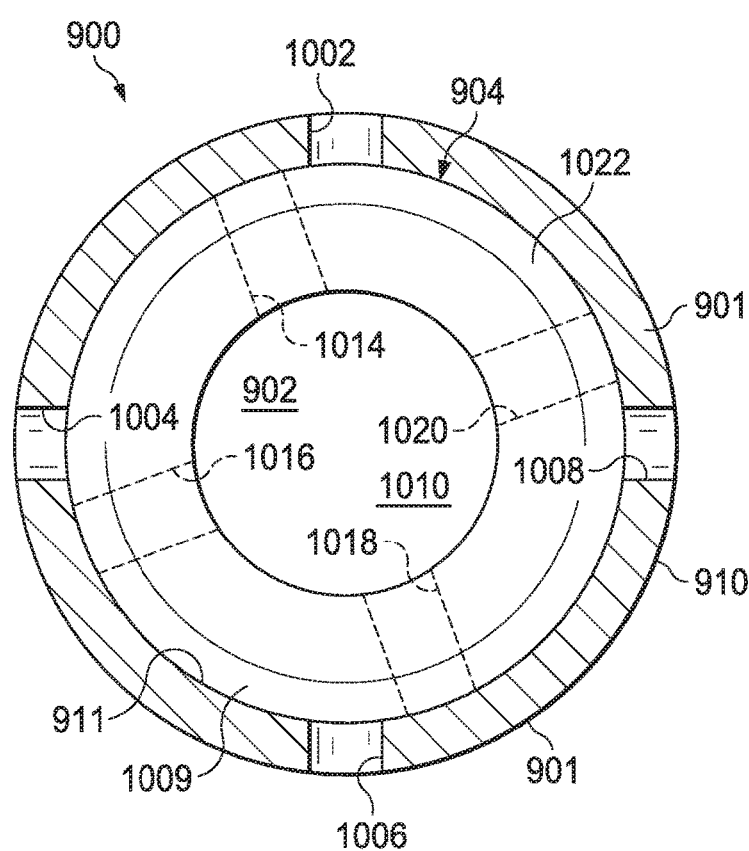
Fig. 9
Fig. 10

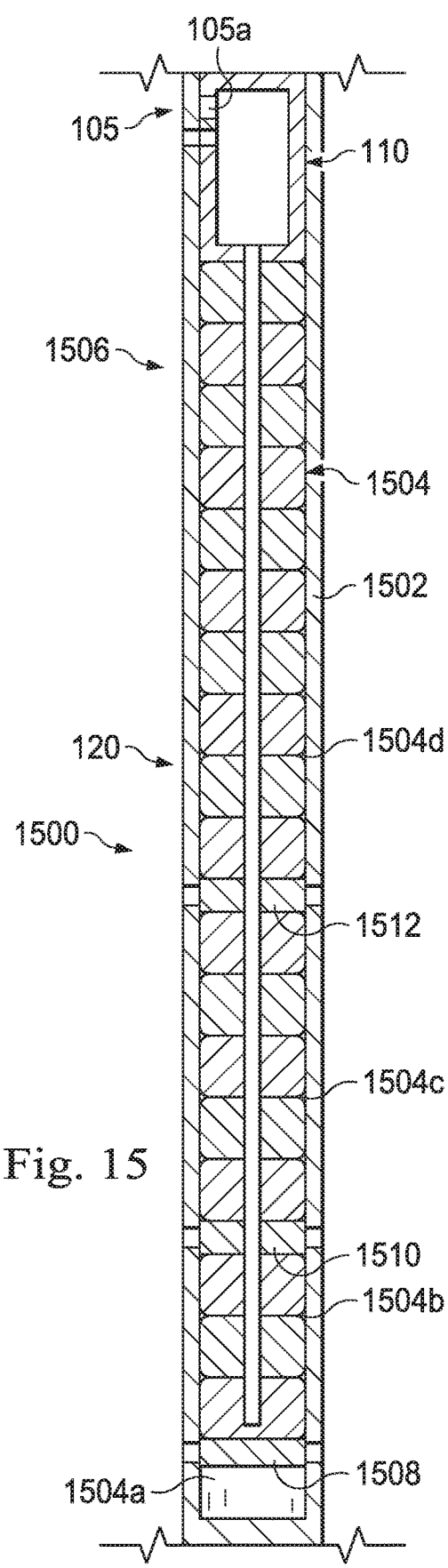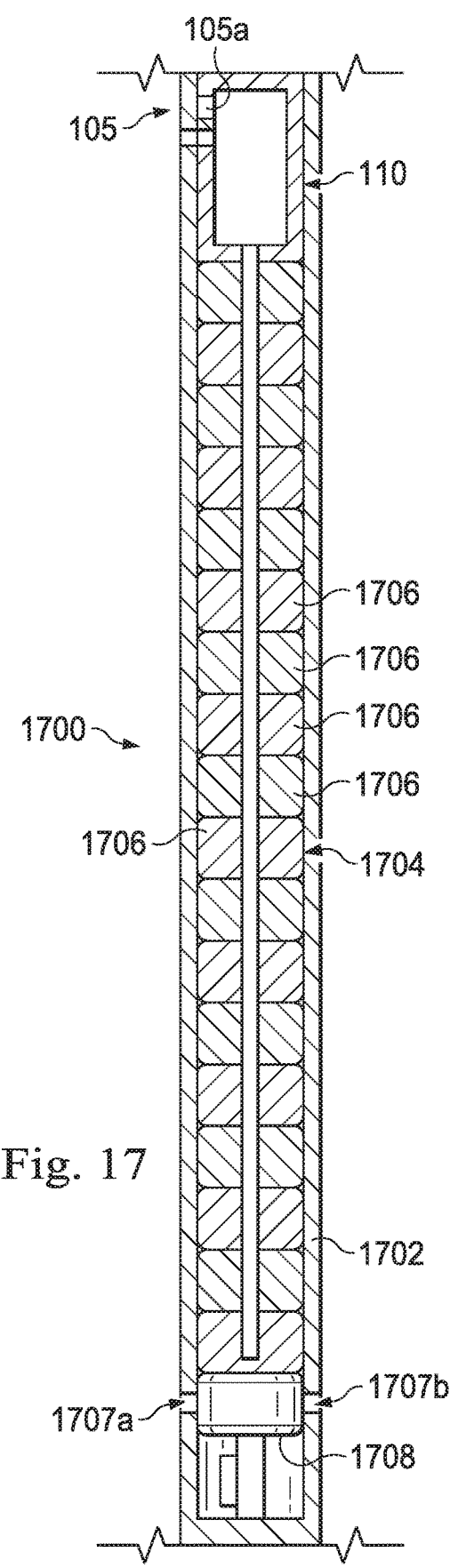

AUTONOMOUS PRESSURE CONTROL ASSEMBLY WITH STATE-CHANGING VALVE SYSTEM

TECHNICAL FIELD

The present disclosure relates generally to a perforation assembly, and specifically, to an autonomous pressure control assembly with a state-changing valve system that changes state multiple times.

BACKGROUND

During a perforating event of a casing string that extends within a wellbore, a transient pressure response occurs when the initially static pressures of the well perforator, wellbore, and surrounding reservoir are dynamically connected. This response is very rapid—on the order of milliseconds—and the shape of the pressure profile is dependent on factors such as the surrounding reservoir characteristics, the wellbore, and a well perforating system associated with the event. Often, the creation of a dynamic pressure overbalance and/or pressure underbalance is desired to produce a specific transient time-pressure profile during the perforating event. A pressure underbalance allows perforations to surge and clean, and also lowers the skin effect due to damage in the formation. A pressure overbalance aids in perforation formation breakdown performance. A reference time-pressure profile may include one or more pressure underbalance or overbalances during the transient pressure response, and generally, balances often-competing mechanisms such as formation production/infectivity, perforation tunnel stability, sand control, and gun and wellbore integrity. Thus, the reference time-pressure profile for the perforating event may be specific to that perforating event and may be based on the factors associated with the reservoir, the wellbore, and the gun system. However, a pressure control assembly for perforation events is assembled and "set" before the assembly is extended downhole. Thus, regardless of unknown factors that may arise downhole before or during the perforating event, the assembly performs according to the previously-loaded instructions that are based on the reference time-pressure profile. That is, there is no opportunity to adjust the settings or instructions of the assembly if unknown or unaccounted factors arise that cause the transient time-pressure profile to depart from the reference time-pressure profile. This may result in deviations between an actual downhole pressure and a reference time-pressure profile, which may result in burst guns, a parted string, collapsed and/or buckled tubing, packer movement, and less than optimal production.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 9 is a schematic illustration of another embodiment of a portion of the assembly of FIG. 1, according to an exemplary embodiment of the present disclosure, the portion of the assembly including a tubular and a valve system;

FIG. 10 is a schematic illustration of an axial cross-sectional view of the tubular and the valve system of FIG. 9 in a first state, according to an exemplary embodiment of the present disclosure;

FIG. 15 is a schematic illustration of yet another embodiment of a portion of the assembly of FIG. 1, according to an exemplary embodiment of the present disclosure;

FIG. 17 is a schematic illustration of yet another embodiment of a portion of the assembly of FIG. 1, according to an exemplary embodiment of the present disclosure;

DETAILED DESCRIPTION

Figure 1:
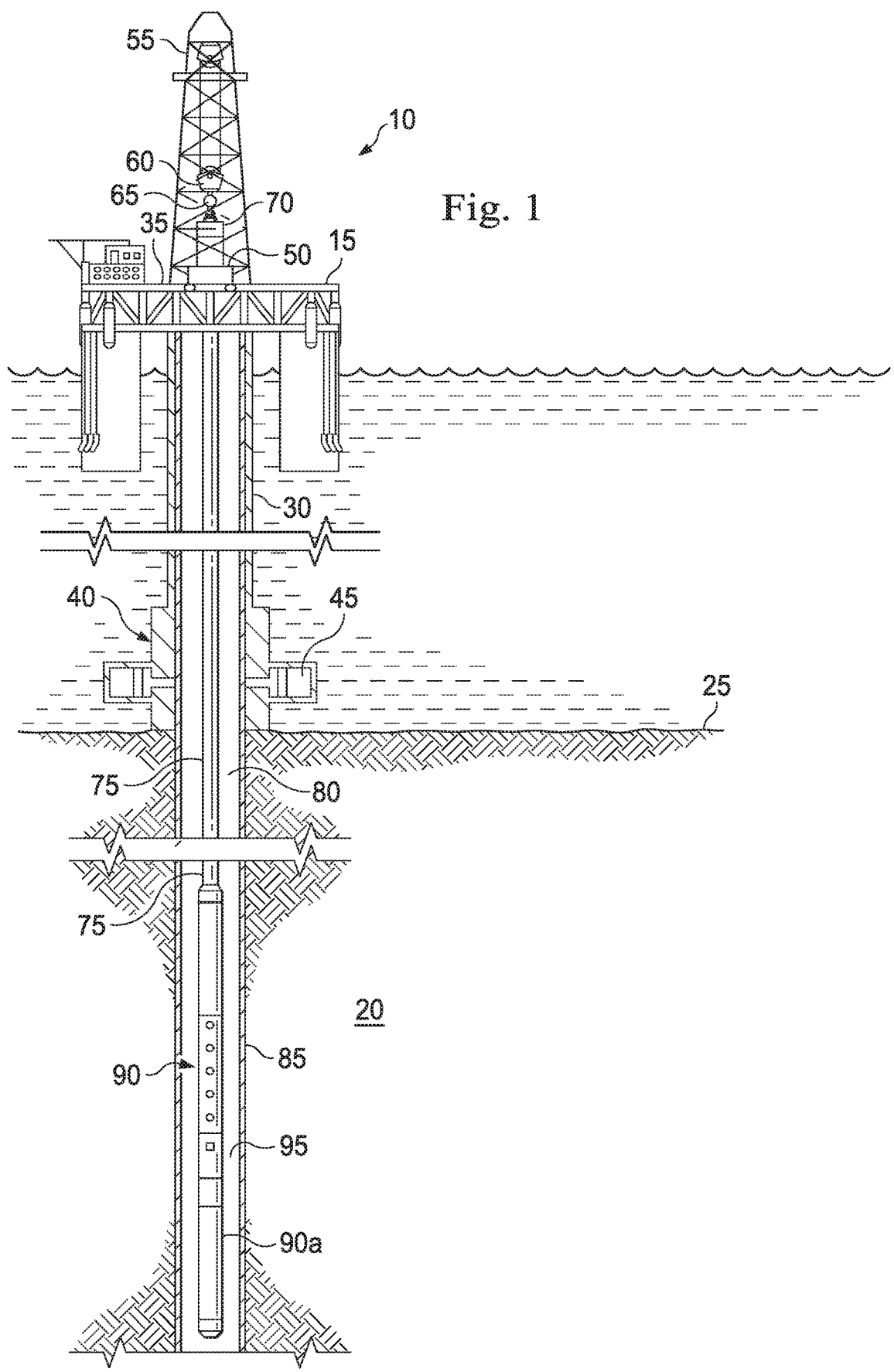
FIG. 1 is a schematic illustration of an offshore oil and gas platform operably coupled to an autonomous annular pressure control assembly for a perforation event, according to an exemplary embodiment of the present disclosure.

Illustrative embodiments and related methods of the present disclosure are described below as they might be employed in an autonomous annular pressure control assembly for a perforation event and method of operating the same. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "down-hole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

FIG. 1 is a schematic illustration of an offshore oil and gas platform generally designated 10, operably coupled by way of example to an autonomous annular pressure control assembly for a perforation event, according to the present disclosure. Such an assembly could alternatively be coupled to a semi-sub or a drill ship as well. Also, even though FIG. 1 depicts an offshore operation, it should be understood by those skilled in the art that the apparatus according to the present disclosure is equally well suited for use in onshore operations. By way of convention in the following discussion, though FIG. 1 depicts a vertical wellbore, it should be understood by those skilled in the art that the apparatus according to the present disclosure is equally well suited for use in wellbores having other orientations including horizontal wellbores, slanted wellbores, multilateral wellbores or the like. Accordingly, it should be understood by those skilled in the art that the use of directional terms such as "above," "below," "upper," "lower," "upward," "downward," "uphole," "down-hole" and the like are used in relation to the illustrative embodiments as they are depicted in the figures, the upward direction being toward the top of the corresponding figure and the downward direction being toward the bottom of the corresponding figure, the uphole direction being toward the surface of the well, the down-hole direction being toward the toe of the well.

Referring still to the offshore oil and gas platform example of FIG. 1, a semi-submersible platform 15 may be positioned over a submerged oil and gas formation 20 located below a sea floor 25. A subsea conduit 30 may extend from a deck 35 of the platform 15 to a subsea wellhead installation 40, including blowout preventers 45. The platform 15 may have a hoisting apparatus 50, a derrick 55, a travel block 60, a hook 65, and a swivel 70 for raising and lowering pipe strings, such as a substantially tubular, axially extending running string 75.

As in the present example embodiment of FIG. 1, a borehole or wellbore 80 extends through the various earth strata including the formation 20, with a portion of the wellbore 80 having a casing string 85 cemented therein. Disposed within the casing string 85 of the wellbore 80 is an autonomous annular pressure control assembly 90, which forms an annulus 95 between an external surface 90*a* of the perforating assembly 90 and the casing string 85.

Figure 2:
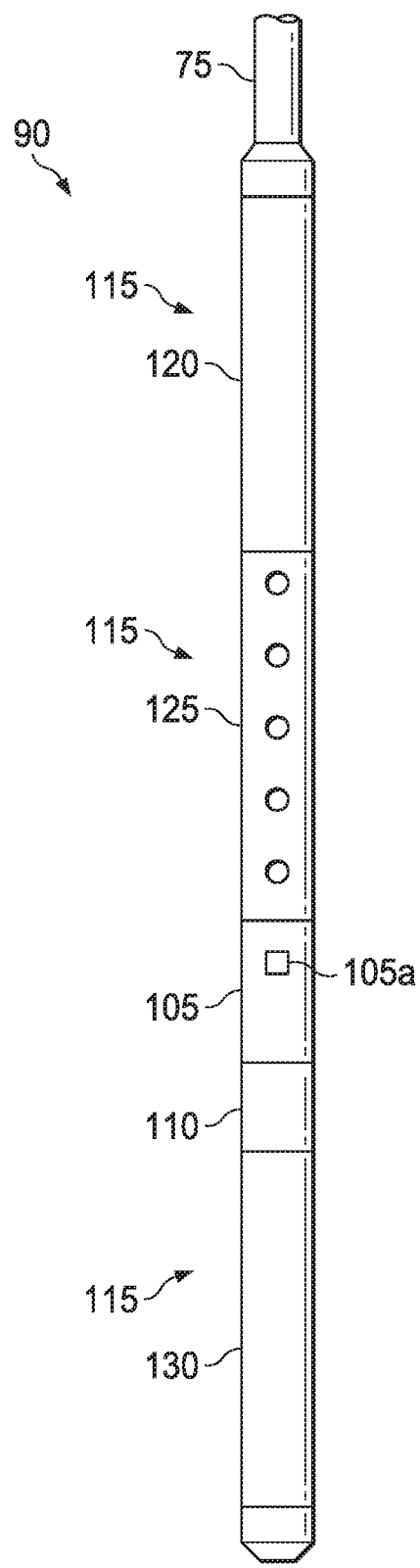
FIG. 2 illustrates a side view of the assembly of FIG. 1, according to an exemplary embodiment of the present disclosure.

FIG. 2 illustrates a side view of the assembly 90, which generally includes a sensor system 105; a controller 110; and one or more pressure adjusting devices ("PADs") 115, such as a pressure increasing device 120, a perforation gun 125, and a pressure reducer, or a pressure decreasing device 130. Generally, each of the PADs 115 is a pressure generator that temporarily adjusts the annular pressure of the fluid with the annulus 95.

The perforation gun 125 is a downhole tool that perforates the casing string 85. The perforation gun 125 may include shaped charges (not shown); a detonating cord (not shown); a detonator (not shown); and a conveyance for the shaped charges (not shown). While one perforation gun 125 is shown in FIG. 2, any number of perforation guns may be located along the assembly 90 and/or the running string 75.

The sensor system 105 may include a sensor 105*a*, such as a pressure sensor, a temperature sensor, and/or an acceleration sensor. The sensor 105*a* may be mechanical or electronic. For example, the sensor 105*a* may be a pressure transducer; a piezoelectric sensor; a strain gage; or any other similar electronic sensor. Additionally, the sensor 105*a* may include one or more pistons (with or without being coupled to a reference chamber charged to a predetermined pressure); a rupture disk or a series of rupture disks; a shear set, such as shear pins; or any other similar mechanical sensor. Generally, the sensor 105*a* is in communication with a liquid, such as a fluid, that is within the annulus 95 and measures an annular pressure of the liquid within the annulus 95. The assembly 90 may include one sensor 105*a* or any number of sensors spaced along the assembly 90 and/or the running string 75.

The pressure increasing device 120 is a device that temporarily increases the pressure within the annulus 95. For example, the pressure increasing device 120 may be a mechanism or tool that includes an energetic material that is initiated in a variety of methods, such as for example through the use of electronic or mechanical percussion or upon impact, etc. The energetic material may include explosives or propellants to generate gas and the like. Alternatively, the pressure increasing device 120 may be a mechanism or tool that includes exothermic material to generate heat and thus cause a pressure increase, or may include a combination of energetic and exothermic material. While the pressure increasing device 120 is shown located above the perforation gun 125 in FIG. 2, the pressure increasing device 120 may be located anywhere along the assembly 90. Additionally, the pressure increasing device 120 may be one of a plurality of pressure increasing devices located along the assembly 90 and/or the running string 75.

The pressure decreasing device 130 is a device that temporarily decreases the pressure within the annulus 95. For example, the pressure decreasing device 130 may be a mechanism or tool that includes an atmospheric chamber. The atmospheric chamber may be introduced or placed in communication with the fluid in the annulus 95 in a variety of ways, such as for example via energetic venting or mechanical venting. The energetic venting may include a shaped charge shooting through to penetrate a wall separating the atmospheric chamber and the fluid in the annulus 95. The mechanical venting may include rupturing of a rupture disk or exposure of a volume via a sliding sleeve. Alternatively, the pressure decreasing device 130 may be a mechanism or tool that includes a mandrel or housing that allows for a change in internal volume of the mandrel or housing, to allow for fluid in the annulus 95 to enter a previously unavailable volume within the mandrel or mandrel to reduce the pressure of the fluid in the annulus 95. Moreover, the pressure decreasing device 130 may be a mechanism or tool that includes an endothermic material that removes heat when actuated and thus causes a pressure reduction in the fluid in the annulus 95. In one embodiment, the pressure decreasing device 130 is an energy sink. While the pressure decreasing device 130 is shown located below the perforation gun 125 in FIG. 2, the pressure decreasing device 130 may be located anywhere along the assembly 90. Additionally, the pressure decreasing device 130 may be one of a plurality of pressure decreasing device 130 located along the assembly 90 and/or the running string 75.

Figure 3A:
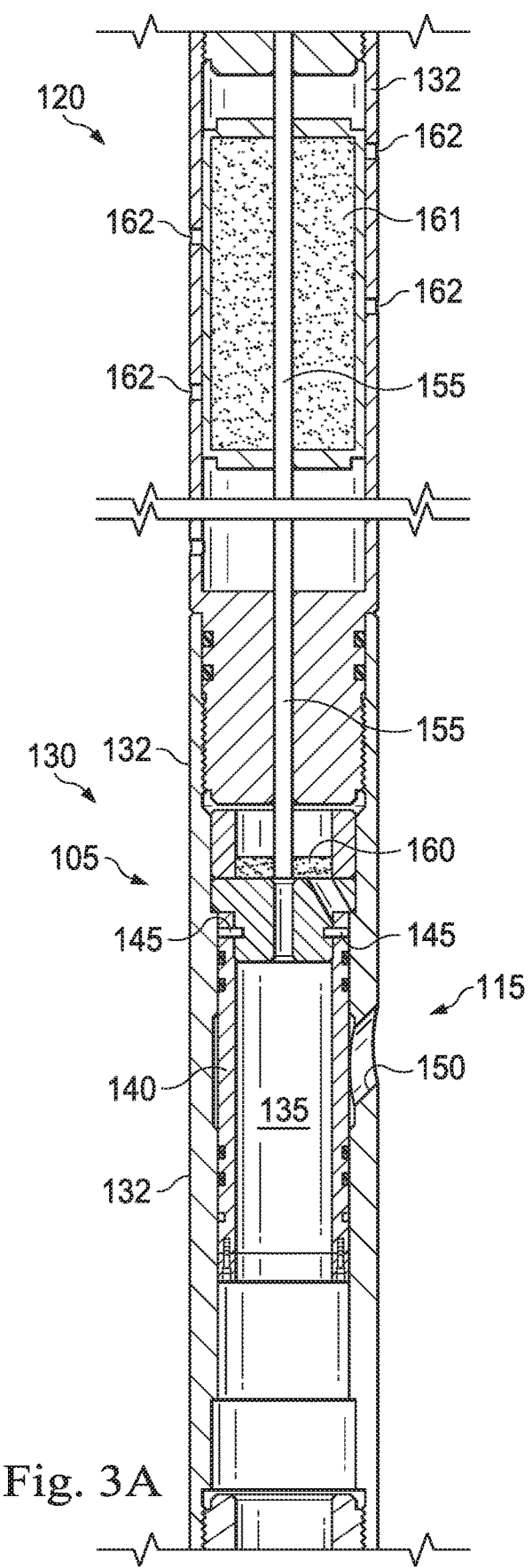
FIG. 3A illustrates a sectional view of a portion of the assembly of FIG. 1 in a first configuration, according to an exemplary embodiment of the present disclosure.
Figure 3B:
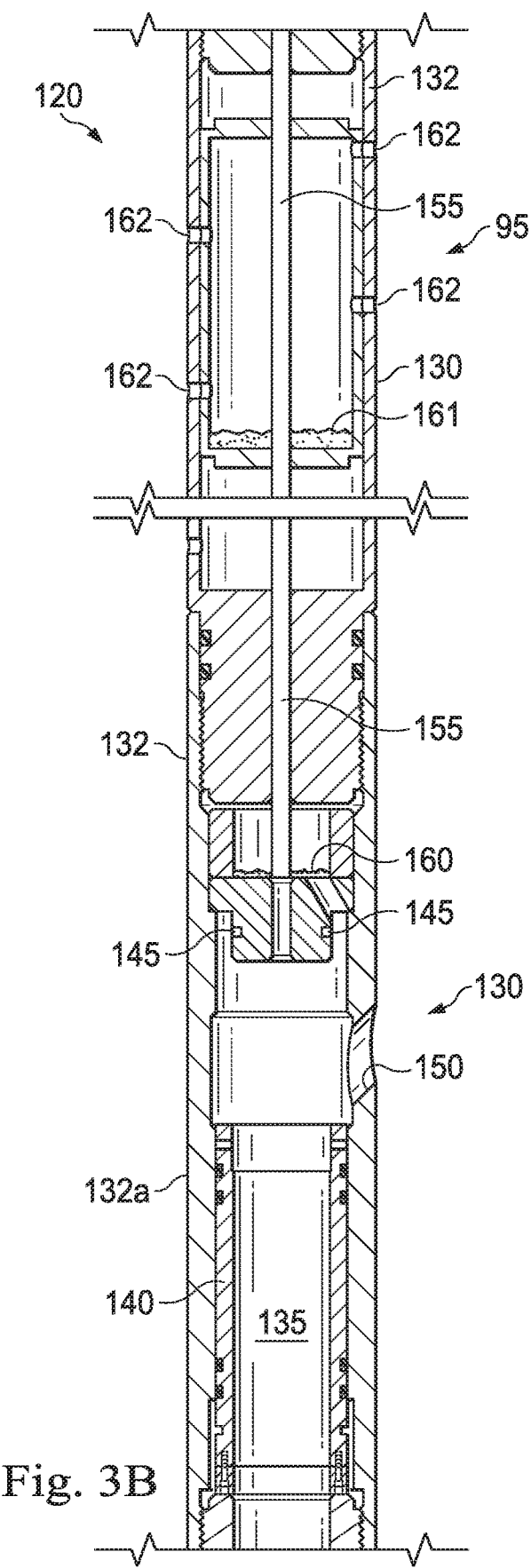
FIG. 3B illustrates a sectional view of the portion of the assembly of FIG. 3A in a second configuration, according to an exemplary embodiment of the present disclosure.

FIGS. 3A and 3B are sectional views of a portion of one embodiment of the assembly 90 in which the pressure decreasing device 130 is a mechanical vent of an atmospheric chamber and the pressure increasing device 120 is an energetic material that is a propellant. The assembly 90 as shown in FIG. 3A is in a first position in which the pressure decreasing device 130 is in the set position and the pressure increasing device 120 is in the set position. The assembly 90 of FIG. 3A includes a tubular 132 that forms an interior passage 135. A sliding sleeve 140 is disposed within the passage 135 and secured, using a plurality of shear pins 145, relative to the tubular 132. The shear pins 145 prevent or limit axial movement of the sliding sleeve 140 relative to the tubular 132, with the sliding sleeve blocking a port 150 extending through an external wall of the tubular 132. Thus, when in the first position, a volume within the sliding sleeve 140 is fluidically isolated from an external surface 132*a* of the tubular 132 and the fluid within the annulus 95. A detonator 155 extends within the tubular 132 and is in contact with propellant a puck 160. The assembly 90 also includes a propellant 161 that is accommodated within another portion of the interior passage 135 of the tubular 132 proximate one or more ports 162 that extend through the external wall of the tubular 132. When the detonator 155 detonates the propellant puck 160, the puck 160 deflagrates and creates gas. This, in turn, causes the sliding sleeve 140 to shear the shear pins 145 so that the sliding sleeve 140 can move axially relative to the tubular 132 to unblock the port 150. That is, after the propellant puck 160 is detonated, the port 150 is "opened" and a volume of fluid that is located near the external surface 132*a* of the tubular 132—in this case fluid within the annulus 95—enters the passage 135 of the tubular 132 to temporarily reduce the annular pressure of the fluid or gas within the annulus 95. Additionally, when the detonator 155 detonates the propellant 161, an energetic reaction is produced and the products of the energetic reaction are directed through ports 162 to temporarily increase the annular pressure of the fluid or gas within annulus 95. The assembly 90 as shown in FIG. 3B is in a second position in which the propellant puck 160 of the pressure decreasing device 130 has been detonated and the propellant 161 of the pressure increasing device 120 has been detonated. The assembly 90 as shown in FIGS. 3A and 3B is only one example, and there are multiple different pressure decreasing devices 130 and pressure increasing devices 120. For example, the propellant could be ignited in several small incremental doses that have fast burn transients and multiple igniters on multiple propellants causing a fast-burn, quick-rising transient pressure increases or decreases (when introducing atmospheric chambers to the fluid within the annulus 95). Alternatively, the assembly 90 may include metered or pressure-biased propellant. For clarity, a single detonating means initiated by the controller 110 for the PADs 115 is shown along the running string 75. However, in other embodiments, parallel and independent detonating means may be provided for each of the PADs 115 in the running string 75 with independent and parallel sensors 105*a* connected to the controller 110.

Figure 4:
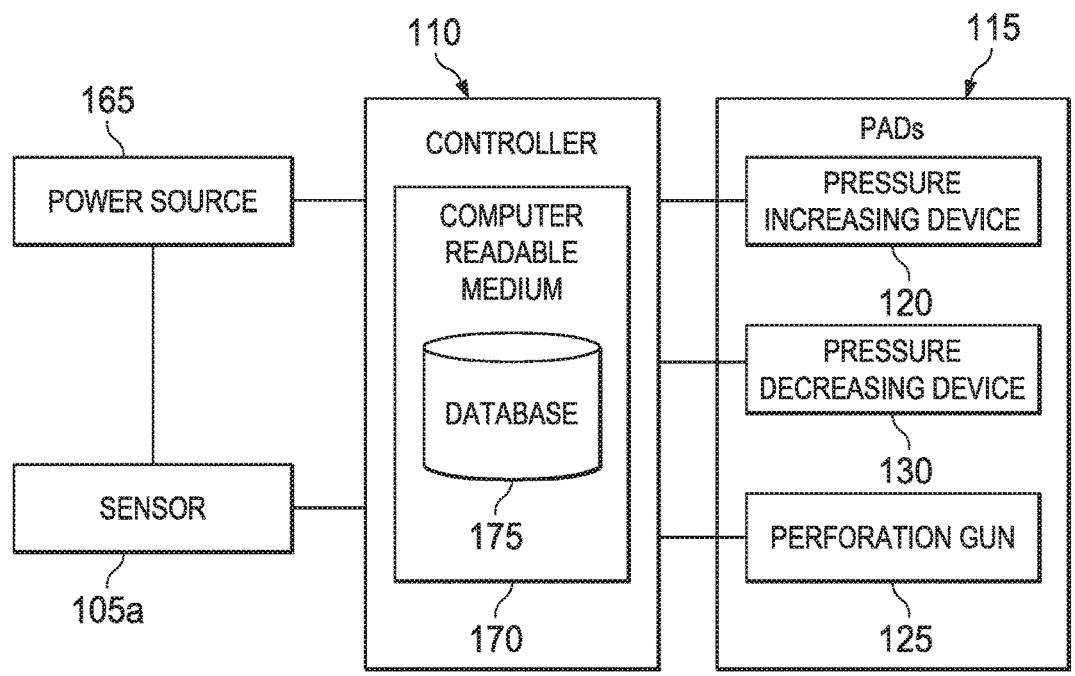
FIG. 4 is a diagrammatic illustration of a portion of the assembly of FIG. 1 that provides a feedback control loop, according to an exemplary embodiment of the present disclosure.

FIG. 4 is a diagrammatic illustration of a portion of the assembly 90 that includes the controller 110, the PADs 115, and the sensor 105*a*. As shown in FIG. 4, the controller 110 includes a computer readable medium 170 operably coupled thereto and a database 175 that is stored in the computer readable medium 170. Instructions accessible to, and executable by, the controller 110 are stored on the computer readable medium 170. In some embodiments, data such as for example, data relating to a reference time-pressure profile or a plurality of reference time-pressure profiles, data relating to a maximum underbalance pressure, data relating to a maximum overbalance pressure, data relating to a peak measured overbalance pressure, and data relating to a peak measured underbalance pressure is stored within the database 175. Additionally and as shown, the sensor 105*a*, the pressure increasing device 120, the pressure decreasing device 130, and the perforation gun 125 are in communication with the controller 110. The controller 110 may also be in communication with a power source 165 such that the controller 110 is powered by the power source 165. The power source 165 may be a battery, a generator, a "wireline," and the like. In some embodiments, the assembly 90 may also include a telemetry module (not shown), which may be wired or wireless. Additionally, the sensor 105*a* may be in communication with the power source 165 such that the sensor 105*a* is powered by the power source 165. In an exemplary embodiment, the controller 110 is a proportional-integral-derivative controller (PID controller).

Figure 5:
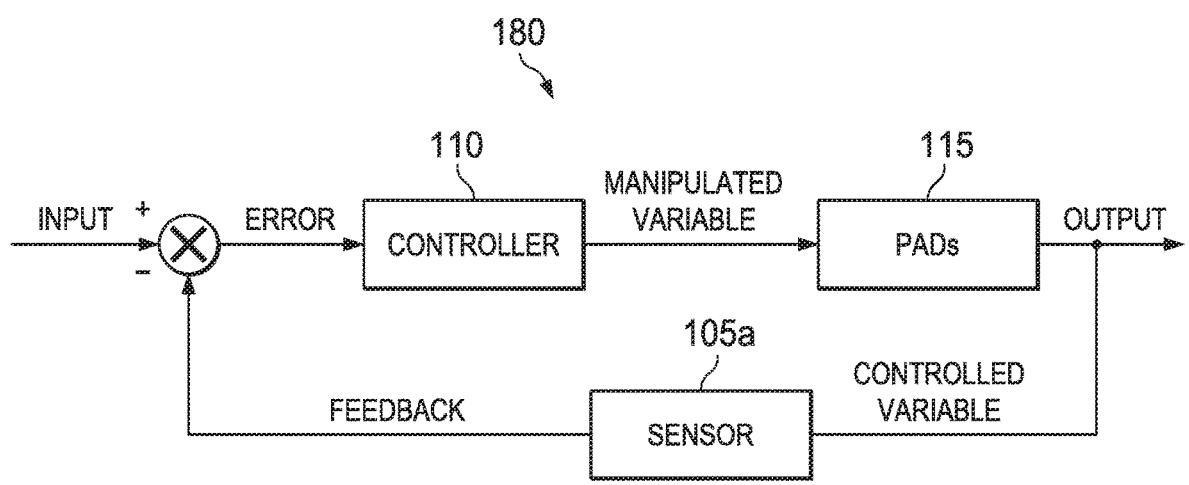
FIG. 5 is a diagrammatic illustration of the feedback control loop of FIG. 4, according to an exemplary embodiment of the present disclosure.

FIG. 5 is a diagrammatic illustration of a feedback control loop 180 that is formed from the controller 110, at least one of the PADs 115, and the sensor 105*a*. Generally, data stored in the database 175, such as a reference pressure, is the input for the feedback control loop 180. However, when the reference pressure is a peak measured overbalance or a peak measured underbalance pressure, the reference pressure may be a historical measured annular pressure, or a previously measured annular pressure. The controlled variable is the annular pressure of the fluid within the annulus 95 and is measured by the sensor 105*a*. The measured annular pressure is the feedback for the feedback control loop 180 and is compared to the input to identify an error, or a difference, between the feedback and the input. Based on the difference between the measured annular pressure and the reference pressure, the controller 110 manipulates or adjusts the annular pressure of the fluid within the annulus 95 by actuating one of the PADs 115. The actuation of one of the PADs 115 affects the annular pressure of the fluid within the annulus 95, which is then measured by the sensor 105a and then compared to the reference pressure. This loop continues so that the annular pressure is controlled using the feedback control loop 180 within the assembly 90. The reference pressure may be time-independent, such as when the reference pressure is a maximum overbalance pressure or maximum underbalance. However, the reference pressure may be time-dependent. Thus, the reference pressure or input to the feedback control loop 180 may change during the perforation event. Additionally, the reference pressure may be relative to the measured annular pressure itself, such as when the reference pressure is a peak measured overbalance or underbalance pressure. Regardless, using a reference pressure that is time-dependent, time-independent, or relative to the measured annular pressure itself as the input to the feedback control loop 180 results in the assembly 90 controlling the dynamic transient time-pressure profile, or the time-pressure profile that is based on the measured annular pressure.

Figure 6:
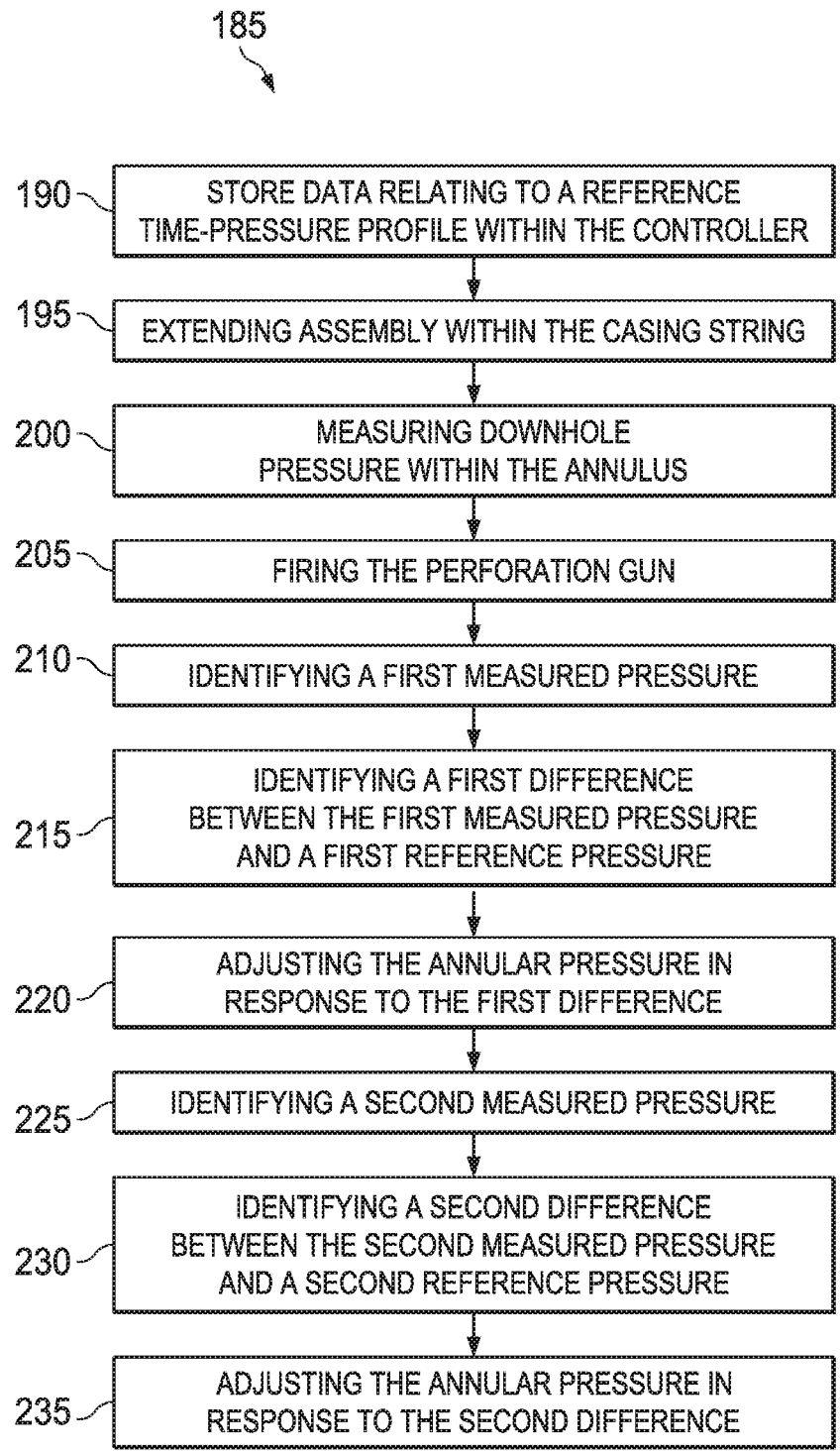
FIG. 6 illustrates a method of operating the assembly of FIG. 1, according to an exemplary embodiment of the present disclosure.

FIG. 6 illustrates a method of operating the assembly 90. The method is generally referred to by the reference numeral 185 and includes storing data relating to reference time-pressure profile within the controller 110 at step 190; extending the assembly 90 within the casing string 85 at step 195; measuring the downhole pressure within the annulus 95 at step 200; firing the perforation gun 125 at step 205; identifying a first measured pressure at step 210; identifying a first difference between the first measured pressure and a first reference pressure at step 215; adjusting the annular pressure based on the first difference at step 220; identifying a second measured pressure at step 225; identifying a second difference between the second measured pressure and a second reference pressure at step 230; and adjusting the annular pressure in response to the second difference at step 235.

Figure 7:
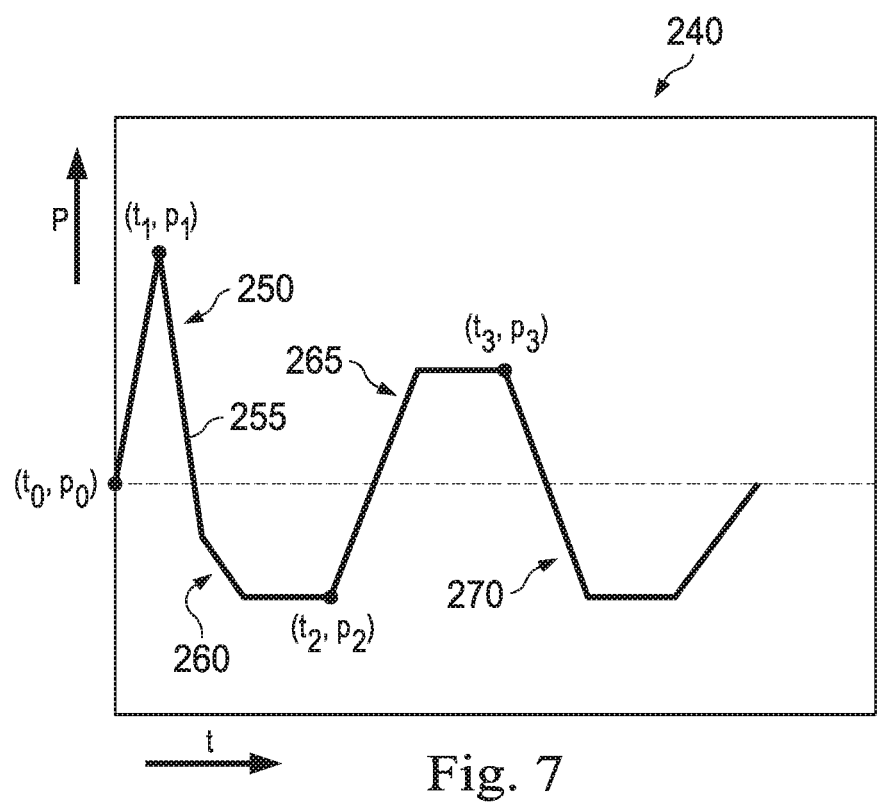
FIG. 7 is a graph illustrating a reference time-pressure profile, according to an exemplary embodiment of the present disclosure.

At the step 190, data relating to the reference time-pressure profile is stored within the assembly 90. FIG. 7 is a graph generally referred to by the reference numeral 240 that illustrates an example of the reference time-pressure profile associated with a perforation event. As shown in FIG. 7, the reference time-pressure profile 240 includes a sudden surge 250 in pressure (reference pressure depicted by the line 255) followed by: a first underbalance 260; an overbalance 265; and then a second underbalance 270. Reference pressures associated with the time-pressure profile 240 may include a pressure at the point (t1, p1); a pressure at the point (t2, p2); and a pressure at the point (t3, p3). The point (t1, p1) is defined by a peak overbalance pressure created by the firing of the perforation gun 125. Looking at the reference time-pressure profile 240 and at the point (t1, p1), a pressure decreasing device is fired to create the underbalance 260. The point (t2, p2) is defined by a peak underbalance pressure after which the underbalance 260 starts to diminish. Again, looking at the reference time-pressure profile 240 and at the point (t2, p2), a pressure increasing device is actuated to create the overbalance 265. The point (t3, p3), is defined by a second peak overbalance pressure after which the overbalance 265 starts to diminish. Looking at the reference time-pressure profile 240 and at the point (t3, p3), a second pressure decreasing device is actuated to create the second underbalance 270. Thus, as the points (t1, p1) (i.e., the first reference pressure), (t2, p2) (i.e., the second reference pressure), and (t3, p3) (i.e., the third reference pressure) are defined by peak pressures, each of the first, second, and third reference pressures are pressures that are relative to the measured annular pressure itself. In this embodiment, the shape of the reference time-pressure profile 240 is determined before the perforating event and during pre job planning. Generally, the reference time-pressure profile 240 is based on a modeling of the perforating event, with the perforating event generally including a period of time before, during, and after the perforation gun 125 is fired. In an exemplary embodiment, data used to create the reference time-pressure profile 240 includes perforation-related data, such as formation properties, wellbore design, and gun system features. The shape of the reference time-pressure profile 240, or the pressure trace, influences important outcomes including perforation tunnel cleanup, tunnel stability, sand control, and gun system integrity. The accuracy of the reference time-pressure profile 240 is dependent on the accuracy of the perforation-related data. Often, departure from the reference time-pressure profile 240 can lead to sub-optimal results, thus increasing the potential of tunnel collapse, premature sand production, impaired production/injectivity, and even failure of the gun string.

At the step 195, the assembly 90 is extended within the casing string 85. The assembly 90 may be conveyed to a desired depth in the wellbore 80 via various means, such as for example, via a "wireline," tubing conveyed perforation system ("TCP"), coil tubing, or "slickline."

At the step 200, the sensor 105a measures the downhole pressure within the annulus 95. In an exemplary embodiment, the sensor 105a measures the annular pressure while it is being extended within the casing string 85 and continues to measure the annular pressure while the assembly 90 is positioned at a perforation location within the casing string 85. However, in other embodiments, the sensor 105a begins to measure the annular pressure after a predetermined amount of time or other triggering event occurs after the assembly 90 is extended within the wellbore 80. Generally, and as the sensor 105a is in communication with the controller 110, the controller 110 receives the measured annular pressure and it may be stored within the database 175. Generally, the measured annular pressure forms a dynamic time-pressure profile that is associated with the perforation event, or a dynamic transient pressure profile.

At the step 205, the perforation gun 125 is fired. Based on the reference time-pressure profile 240, a timed event, or receipt of other instruction, the controller 110 actuates the perforation gun 125 to fire such that the casing string 85 is perforated. The firing of the perforation gun 125 corresponds to a point (t0, p0) of the reference time-pressure profile 240. The firing of the perforation gun 125 results in a pressure surge similar to the sudden surge 250 of the reference time-pressure profile 240. Generally, the firing of the perforation gun 125 results in a sharp pressure spike in the measured annular pressure to reestablish (after the casing string 85 is installed) the communication between the wellbore 80 and the formation 20. The perforation gun 125 may be actuated by a variety of means and is not limited to being actuated by the controller 110. For example, the perforation gun 125 may fire based on a timer within the perforation gun 125, a sensor on the perforation gun 125, or receipt of other instruction.

At the step 210, a first measured pressure is identified at the controller 110.

At the step 215, the controller 110 identifies or determines a first difference between the first measured pressure and a first reference pressure. In this embodiment and at the step 215, the input for the feedback control loop 180 is a previously measured annular pressure and the first measured annular pressure is a more-recently measured annular pressure. Thus, the controller 110 identifies when the measured peak overbalance pressure (point (t1, p1)) has been reached by comparing the previously measured annular pressure with the more-recently measured annular pressure (i.e., determining the first difference).

At the step 220, the annular pressure is adjusted using one of the PADs 115. Specifically, after the controller 110 determines that the measured annular pressure has reached the measured peak overbalance pressure, the controller 110 actuates the pressure decreasing device 130 so that the measured annular pressure will be reduced or temporarily decreased. The controller 110 may actuate the pressure decreasing device 130 or any of the PADs 115 by sending a signal to the first decreasing device 130 or any of the PADs 115. In this embodiment, actuating the pressure decreasing device 130 may result in an underbalance, similar to the first underbalance 260 of the reference time-pressure profile 240. Generally, the first underbalance 260 is to clean tunnels after gas fracturing.

At the step 225, a second measured pressure is identified at the controller 110.

At the step 230, the controller 110 identifies or determines a second difference between the second measured pressure and a second reference pressure. The step 230 is substantially similar to the step 215 except that the second reference pressure is a peak measured underbalance pressure. Thus, the controller 110 identifies when the measured peak underbalance pressure has been reached by comparing the previously measured annular pressure with the more-recently measured annular pressure (i.e., determining the second difference).

At the step 235, the annular pressure is adjusted using one of the PADs 115. Specifically, after the controller 110 determines that the measured annular pressure has reached the peak underbalance pressure (point (t2, p2)), the controller 110 actuates the pressure increasing device 120. Actuating the pressure increasing device 120 may result in a pressure overbalance similar to the pressure overbalance 265 of the reference time-pressure profile 240. Generally, the overbalance 265 is to crack the formation 20 rock by gas fracturing after the perforating tunnels have been cleaned.

Steps similar to the steps 210, 215, and 220 may be performed with a third reference pressure during which the controller 110 actuates a second pressure decreasing device 130 when the measured annular pressure reaches another peak overbalance (point (t3, p3)) so as to create a second pressure underbalance, similar to the second pressure underbalance 270 of the reference time-pressure profile 240. The second underbalance 270 is generally created to clean the tunnels after gas fracturing.

Figure 8:
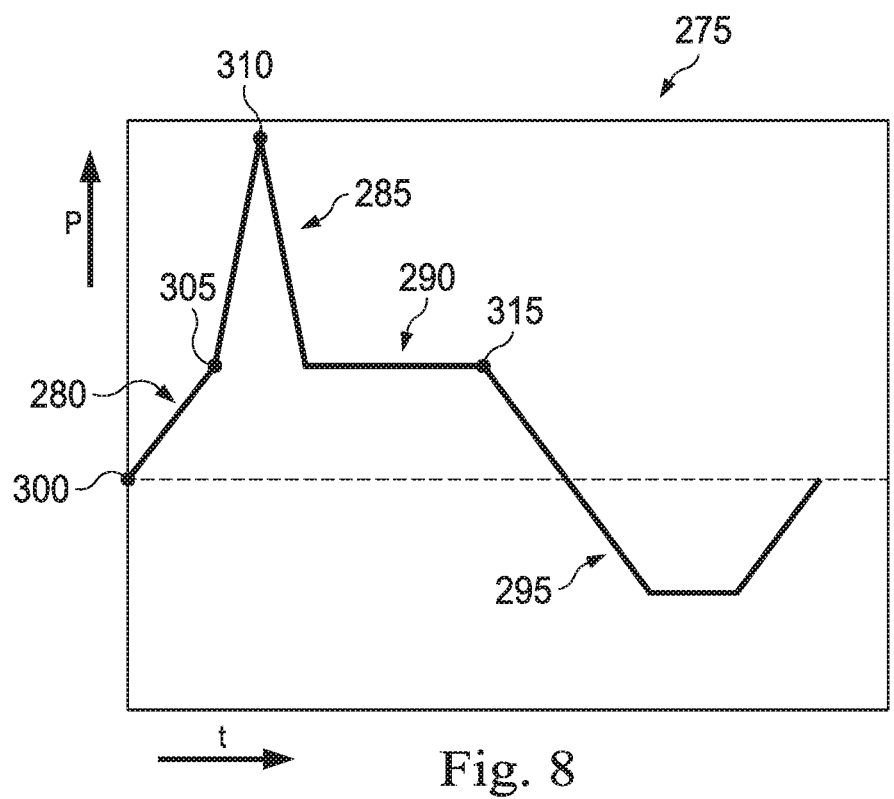
FIG. 8 is a graph illustrating another reference time-pressure profile, according to an exemplary embodiment of the present disclosure.

The method 185 may be altered in a variety of ways. For example, firing the perforation gun 125 at the step 205 may occur after the pressure increasing device 120 is actuated. FIG. 8 is a graph generally referred to by the reference numeral 275 that illustrates another reference time-pressure profile that includes a first pressure overbalance 280; a second pressure overbalance 285; a third pressure overbalance 290; and a first pressure underbalance 295. Using the time-pressure profile 275, the assembly 90 actuates a pressure increasing device 120 at or after a point indicated by the numeral 300. After the assembly 90 determines that the annular pressure has peaked in response to the actuation of the pressure increasing device 120, the assembly 90 fires the perforation gun 125 at a point indicated by the numeral 305, which results in the overbalance 285. After the assembly 90 determines that the annular pressure has peaked in response to the actuation of the perforation gun 125, the assembly 90 actuates another pressure increasing device 120 at the point indicated by the numeral 310, which results in the overbalance 290. After the assembly 90 determines that the annular pressure has peaked in response to the actuation of the another pressure increasing device 120, the assembly 90 actuates a pressure decreasing device 130 at the point indicated by the numeral 315, which results in the pressure underbalance 295.

The method 185 may be altered in additional ways. For example, the reference pressures may be associated with a maximum overbalance pressure so the controller 110 may actuate the pressure decreasing device 130 when the measured annular pressure is at or exceeds the maximum overbalance pressure. Thus, by reducing the annular pressure, the assembly 90 may prevent damage to the formation 20, the assembly 90, the casing string 85, and other structures due to over pressurization. Additionally, when the reference pressure is a maximum underbalance pressure, the controller 110 may actuate the pressure increasing device 120 when the measured pressure is at or exceeds the maximum underbalance pressure. Thus, by increasing the annular pressure, the assembly 90 may prevent damage to the formation, the assembly 90, the casing string 85 and other structures due to a pressure over underbalance. Additionally, the pressure increasing device 120 may be actuated when the controller 110 determines that a predetermined reference overbalance pressure has not been reached. Thus, if the measured overbalance is not sufficient, the assembly 90 may augment the overbalance by actuating the pressure increasing device 120. Similarly, the pressure decreasing device 130 may be actuated when the controller 110 determines that a predetermined reference underbalance pressure has not been reached. Thus, if the measured underbalance is not sufficient, the assembly 90 may augment the underbalance by actuating the pressure decreasing device 130. Additionally, and when the sensor 105a is one or more piston type accumulators such as for example, a gas-charged accumulator that is a hydraulic accumulator with gas as the compressible medium that is charged to specific reference pressure, the method 185 may be further altered in that the steps 210 and 215 are omitted and instead adjusting the annular pressure at the step 220 is in response to the movement of the piston of the piston type accumulator.

In another exemplary embodiment, data relating to a plurality of reference time-pressure profiles are be stored within the controller 110 of the assembly 90 at the step 190. Data relating to a plurality of reference time-pressure profile may be stored in the controller 110 of the assembly 90. Logic data may be stored in the controller 110 such that the controller 110 is capable of selecting—based on the parameters measured by the sensor 105a—the input (i.e., one of the plurality of the reference time-pressure profile) for the feedback control loop 180. Additionally, data relating to a default reference time-pressure profile may be stored in the controller 110 of the assembly 90 before the assembly 90 is extended within the wellbore 80. Then, upon measuring down-hole parameters using the sensor 105a, the controller may, based on the measured down-hole parameters, determine that a reference time-pressure profile that is different from the default reference time-pressure profile should be used as the input for the feedback control loop 180. That is, the assembly 90 may chose the input for the feedback control loop 180 based on feedback from the sensor 105a.

The order of the components (i.e., the PADs 115, the sensor system 105, the controller 110) in the perforating assembly 90 is not fixed and can be interchanged as appropriate. Moreover, multiple components of each type can be included in the running string 75 to allow further flexibility. In an exemplary embodiment, a variety of assemblies 90 may be spaced along the running string 75.

FIG. 9 illustrates a portion of another embodiment of the assembly 90. The another embodiment of the assembly 90 includes the sensor system 105, the controller 110, and another embodiment of the pressure decreasing device 130 that generally referred to by the numeral 900. The pressure decreasing device 130 is in communication with the controller 110. The pressure decreasing device 900 includes a tubular 901 that forms a chamber 902 and a valve system 904.

The chamber 902 is a pressure chamber that is used to temporarily reduce the measured annular pressure in the annulus 95 and in turn, reduce the pressure in the formation 20. The chamber 902 may be a surge chamber in that the chamber 902 is configured to receive fluid from the annulus 95 to reduce the measured annulus pressure in the annulus 95. The tubular 901 has an exterior surface 910 and an interior surface 911 that defines at least a portion of the chamber 902. The annulus 95 (shown in FIG. 1) is formed between the exterior surface 910 and the casing string 85.

The valve system 904 may be positioned relative to the chamber 902 to control or allow a flow of fluid into the chamber 902 from the annulus 95, thereby reducing the measured annulus pressure in the annulus 95. As shown in FIG. 9, the valve system 904 is in fluid communication with the chamber 902 and may at least partially extend within the chamber 902 or define a portion of the chamber 902.

The sensor system 105 may be positioned away from the valve system 904 to reduce the effect of the rate of fluid flowing through the valve system 904 on any pressure measurements or other types of measurements generated by the sensor system 105. That is, at least a portion of the chamber 902 extends between the valve system 904 and the pressure sensor 105a. However, in some implementations, the valve system 904 may extend between the chamber 902 and the pressure sensor 105a or vice versa. Other arrangements of the valve system 904, the chamber 902, and the pressure sensor 105a are also contemplated here. The sensor system 105 may send the information, such as the measured annular pressure, generated by the sensor system 105 to the controller 110 for processing. The sensor system 105 may send the information to the controller 110 wirelessly. In some illustrative examples, the sensor system 105 may send the information to the controller 101 over one or more wired communications links.

The controller 110 is operably coupled to the valve system 904 and controls the changing of a state of the valve system 904 multiple times based on information received from the sensor system 105. For example, the controller 110 may control the valve system 904 to move the valve system 904 from a first state into a second state and, later, from the second state back into the first state. In this example, the first state may be a closed state and the second state may be an open state. In another example, the controller 110 may control the valve system 904 to move the valve system 904 from a first state into a second state, from the second state into a third state, and from the third state back into either the first state or the second state. In this example, the first state may be a fully closed state; the second state may be a fully open state; and the third state may be a partially closed state. In this manner, the controller 110 may control the valve system 904 to switch between multiple states any number of times. The valve system 904 may include one or more valves and an actuation mechanism that allows the valve system 904 to change states multiple times. The controller 110 controls operation of the valve system 904 to create measured annular pressures that substantially match the reference pressure profile that is stored in the controller 110 for the wellbore pressure. Each of these measured annular pressures may be either an underbalance condition, such as a dynamic underbalance condition, or an overbalance condition, such as a dynamic overbalance condition.

FIG. 10 is a schematic illustration of an axial cross-sectional view of the tubular 901 and the valve system 904 located within the chamber 902. The tubular 901 forms a plurality of ports that extend through the wall of the tubular 901. The plurality of ports includes the ports 1002, 1004, 1006, and 1008. However, any number of ports is considered here. The valve system 904 includes a rotatable tubular 1009 forming an interior passageway 1010. The interior passageway 1010 at least partially defines the chamber 902 or is in fluid communication with the chamber 902. The tubular 1009 also forms a plurality of valve ports that extend through a wall of the tubular 1009. The plurality of valve ports includes valve ports 1014, 1016, 1018, and 1020. However, any number of ports is considered here.

The valve system 904 is shown in a closed state in FIG. 10. When the valve system 904 is in the closed state, the tubular 1009 is rotatably arranged relative to the tubular 901 such that the plurality of valve ports does not align with the plurality of ports. That is, the wall of the tubular 1009 extends over the entirety of each of the ports 1002, 1004, 1006, and 1008. Accordingly, the interior passageway 1010 and thus the chamber 902 is fluidically isolated from the annulus 95.

Figure 11:
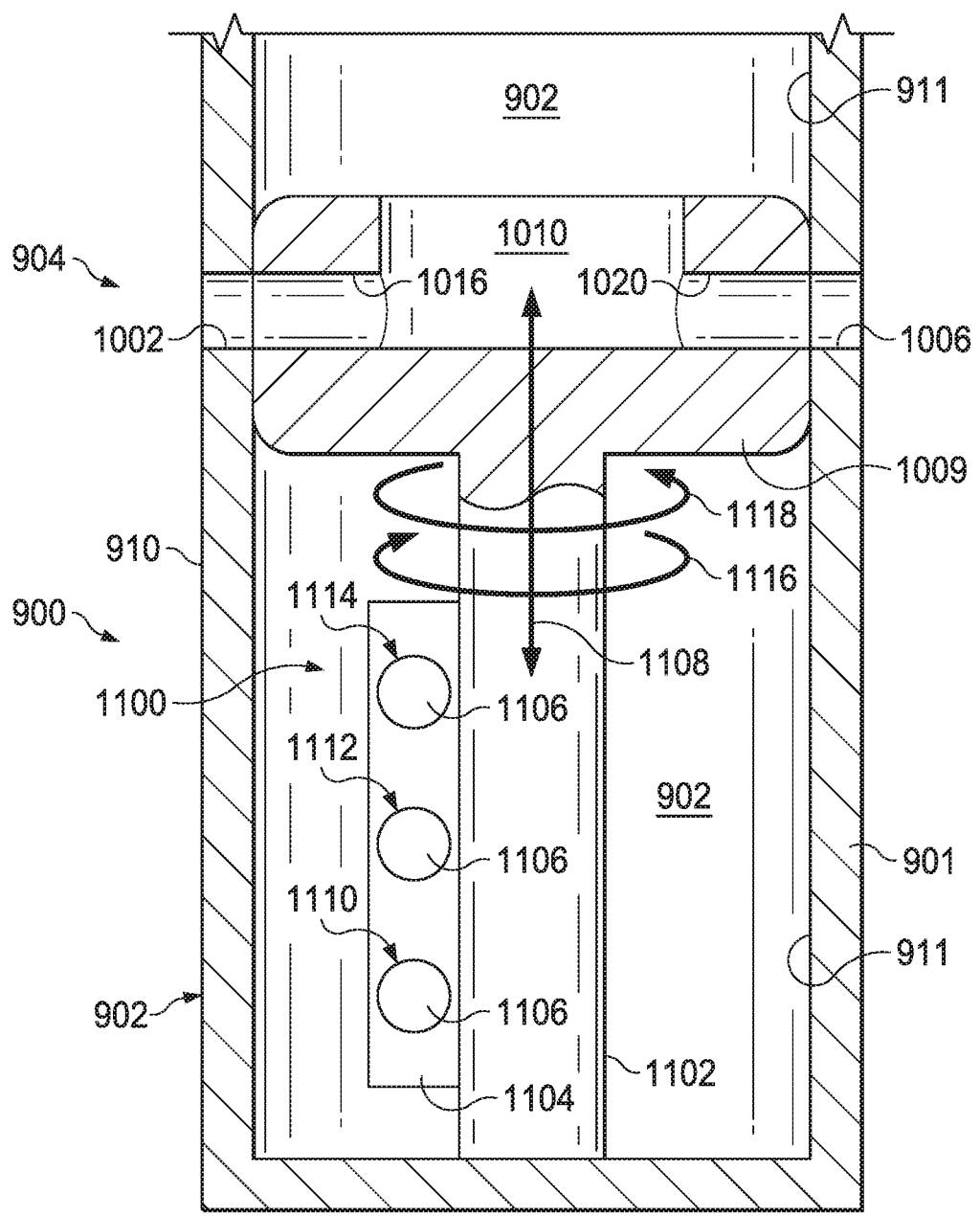
FIG. 11 is a schematic illustration of a side view of the tubular and the valve system of FIG. 9 in a second state, according to an exemplary embodiment of the present disclosure.

FIG. 11 is a schematic illustration of a side view of the valve system 904 located within the chamber 902. The valve system 904 is depicted in an open state in FIG. 11. In the open state, a plurality of the valve ports is substantially aligned with the plurality of ports. As shown in FIG. 11, the valve ports 1016 and 1020 are aligned with the ports 1002 and 1006, respectively, such that a fluid may flow between the annulus 95 and the chamber 902. For example, when the valve system 904 is in the open state, the chamber 902 and the annulus 95 are in fluid communication via the interior passageway 1010 and the ports 1002, 1004, 1006, 1008, 1014, 1016, 1018, and 1020. In addition to tubular 901, the valve system 904 includes a rotatable body 1102, a rotatable actuation plate 1104, and an actuation system 1106. The rotatable actuation plate 1104 may be coupled to the rotatable body 1102. The actuation system 1106 may be coupled to the rotatable actuation plate 1104. The rotatable body 1102 may be rotatably coupled to the tubular 901 a fixedly coupled to the tubular 1009.

Operation of the actuation system 1106 may cause rotation of the rotatable body 1102, the rotatable actuation plate 1104, and the tubular 1009 about the axis 1108. For example, the actuation system 1106 may include a first set of actuators 1110, a second set of actuators 1112, and a third set of actuators 1114 that are coupled to the rotatable actuation plate 1104. Each of these sets of actuators may include a first actuator for causing rotation of the rotatable body 1102 in a first rotational direction 1116 about the axis 1108 and a second actuator for causing rotation of the rotatable body 1102 in a second rotational direction 1118 about the axis 1108. Rotation of the rotatable body 1102 causes the valve system 904 to change state by rotating the tubular 1009 and thus aligning or misaligning the ports 1002, 1004, 1006, and 1008 with the ports 1014, 1016, 1018, and 1020, respectively. For example, rotation of the rotatable body 1102 in one of the first rotational direction 1116 or the second rotational direction 1118 may move the valve system 904 into an open state, while rotation in the other rotational direction may move the valve system 904 into a closed state.

The controller 110 is in communication with and controls each set of actuators 1110, 1112, and 1114 in the actuation system 1106 based on the information, such as the measured annular pressure, received from the sensor system 105. Although the actuation system 1106 in FIG. 11 is described as including only three sets of actuators, the actuation system 1106 may include any number of actuator sets that allow the valve system 904 to change state multiple times.

The actuation system 1106 may include actuators that are pyrotechnically actuated. These actuators may be referred to as pyrotechnic actuators. For example, the actuation system 1106 may include a pyrotechnic actuator that actuates in response to an electrically initiated pyrotechnic charge that provides a rotational force. Additionally or alternatively, the actuation system 1106 may include one or more other types of actuators that may be actuated to change the state of the valve system 904 more than once.

Figure 12:
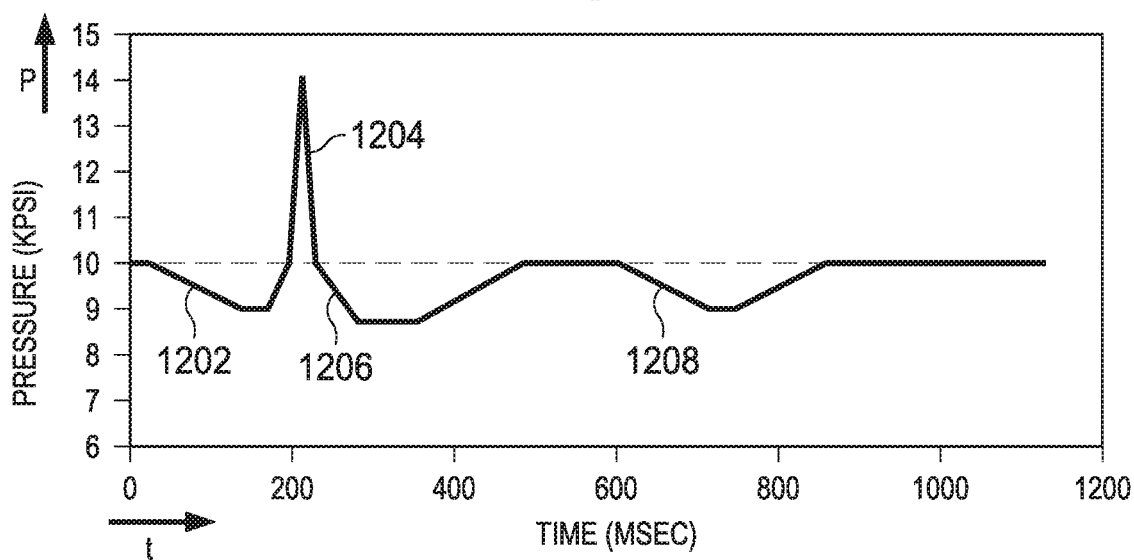
FIG. 12 is a graph illustrating a time-pressure profile created by the portion of the assembly of FIG. 9, according to an exemplary embodiment of the present disclosure.

In operation, the assembly 90 that includes the pressure decreasing device 900 results in a time-pressure profile having cyclical underbalance conditions. FIG. 12 is a graph generally referred to by the reference numeral 1200 that illustrates a time-pressure profile resulting from the operation of the assembly 90 when the assembly 90 includes the pressure decreasing device 900. The time-pressure profile includes a first pressure underbalance 1202; a first pressure overbalance 1204 associated with the firing of the perforation gun 125; a second pressure underbalance 1206; and a third pressure underbalance 1208. Generally, the first pressure underbalance 1202 is caused by opening (to allow the fluid in the annulus 95 to enter the chamber 902) and closing the valve system 904 prior to the firing of the perforation gun 125 in order to allow a the fluid from the annulus 95 to fill a portion of the chamber 902 and to reduce the penetration loss caused by shooting across a highly pressurized fluid gap (prior to hitting the casing). Generally, the second pressure underbalance 1206 is created by the fluid in the annulus 95 entering into voids or chambers in the perforation gun 125 that is created by the firing of the perforation gun 125. The third pressure underbalance 1208 is created by opening the valve system 904 to allow the fluid within the annulus 95 to enter the chamber 902, thereby reducing the pressure within the annulus 95. The second pressure underbalance 1206 and the third pressure underbalance 1208 pull any remnant debris remaining in the perforation tunnels.

Figure 13:
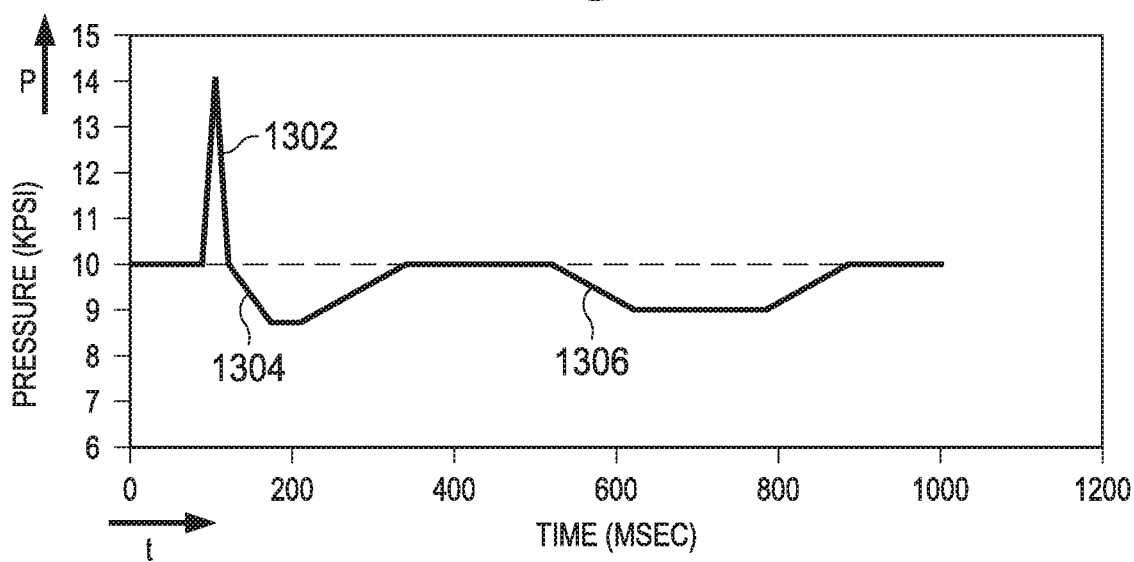
FIG. 13 is a graph illustrating a time-pressure profile created by the portion of the assembly of FIG. 9, according to an exemplary embodiment of the present disclosure.

FIG. 13 is a graph generally referred to by the reference numeral 1300 that illustrates a time-pressure profile resulting from the operation of the assembly 90 when the assembly 90 includes the pressure decreasing device 900. The time-pressure profile includes a first pressure overbalance 1302 associated with the firing of the perforation gun 125; a first pressure underbalance 1304; and a second, extended pressure underbalance 1306. Generally, the first pressure underbalance 1304 is created by the fluid in the annulus 95 entering into voids or chambers in the perforation gun 125 that is created by the firing of the perforation gun 125. The second, extended pressure underbalance 1306 is created by opening the valve system 904 to allow the fluid within the annulus 95 to enter the chamber 902, thereby reducing the pressure within the annulus 95.

Figure 14:
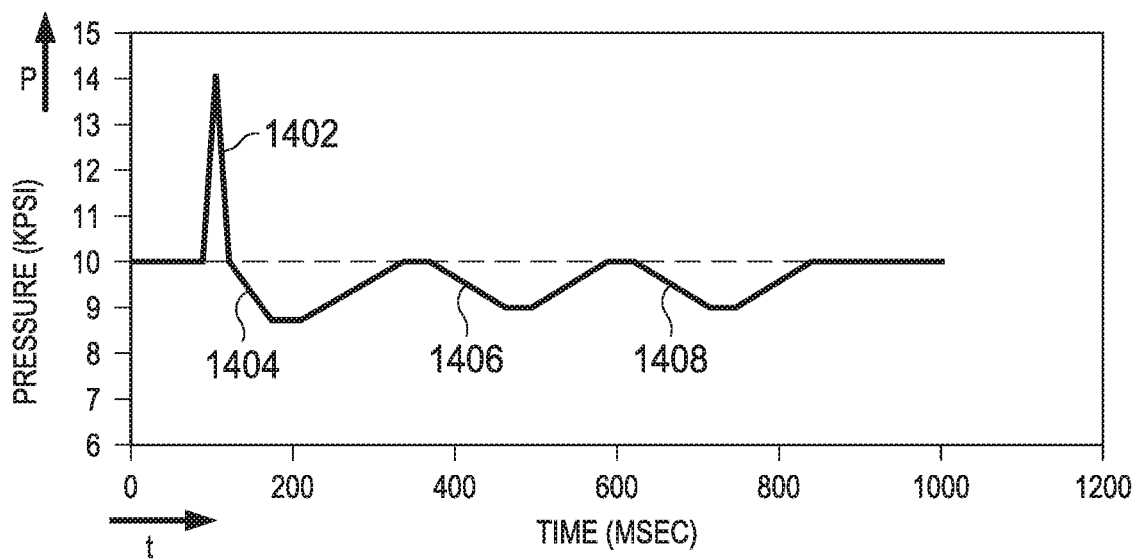
FIG. 14 is a graph illustrating a time-pressure profile created by the portion of the assembly of FIG. 9, according to an exemplary embodiment of the present disclosure.

FIG. 14 is a graph generally referred to by the reference numeral 1400 that illustrates a time-pressure profile resulting from the operation of the assembly 90 when the assembly 90 includes the pressure decreasing device 900. The time-pressure profile includes a first pressure overbalance 1402 associated with the firing of the perforation gun 125; a first pressure underbalance 1404; a second pressure underbalance 1406; and a third pressure underbalance 1408. The first, second, and third pressure underbalances 1404, 1406, and 1408 are created by the opening and closing of the valve system 904. That is, to create the first pressure underbalance 1404, the valve system 904 is opened such that a first portion of the chamber 902 is filled with fluid from the annulus 95 prior to closing the valve system 904. The valve system 904 is closed before the entirety of the chamber 902 is filled with the fluid. To create the second pressure underbalance 1406, the valve system 904 is opened such that a second portion (that is larger than the first portion and includes the first portion) of the chamber 902 is filled with the fluid. The valve system 904 is closed before the entirety of the chamber 902 is filled with fluid. To create the third pressure underbalance 1408, the valve system 904 is opened such that a third portion (that is larger than the first and second portion and includes the first and second portion) is filled with the fluid from the annulus 95. In an exemplary embodiment, the first, second, and third pressure underbalances 1404, 1406, and 1408 are created to "crack and clear" the perforation tunnel in a brittle-type formation.

FIG. 15 illustrates a portion of yet another embodiment of the assembly 90. The yet another embodiment of the assembly 90 includes the sensor system 105, the controller 110, and another embodiment of the pressure increasing device 120 that generally referred to by the numeral 1500.

The pressure increasing device 1500 includes a tubular 1502 forming a chamber 1504 that accommodates the energetic material. The energetic material may take the form of one module, or, as depicted in FIG. 15, a plurality of modules 1506. The energetic material may be, for example, propellant. As noted above, ignition of the energetic material may cause an increase in the wellbore pressure and the measured annulus pressure, and thereby a dynamic overbalance condition. Each of the plurality of modules 1506 may be separately controlled by the controller 110. For example, the controller 110 may send a signal to each of the plurality of modules 1506 to ignite each module. The chamber 1504 may be segmented by a first valve 1508, a second valve 1510, and a third valve 1512. In one embodiment, the valves 1508, 1510, and 1512 are blow-open valves and fluidically isolate the chamber 1504 into a first segment 1504a, a second segment 1504b, a third segment 1504c, and a fourth segment 1504d. In operation, igniting the energetic material in the second segment 1504b of the chamber 1504 opens the blow-open valve 1508 and increases the pressure in the annulus 95 and/or the measured annular pressure. After opening the blow-open valve 1508, the first segment 1504a and the second segment 1504b of the chamber 1504 is filled with fluid from the annulus 95. However, the fluid from the annulus 95 does not enter the third segment 1504c due to the blow-open valve 1510 remaining closed. When the controller 110 determines that another pressure overbalance event should occur, the energetic material in the third segment 1504c is ignited to open the blow-open valve 1510 and increase the pressure in the annulus 95 and/or the measured annular pressure. After opening the blow-open valve 1510, the second third segment 1504c of the chamber 1504 is filled with fluid from the annulus 95. However, the fluid from the annulus 95 does not enter the fourth segment 1504d due to the blow-open valve 1512 remaining closed. When the controller 110 determines that another pressure overbalance event should occur, the energetic material in the fourth segment 1504*d* is ignited to open the blow-open valve 1512 and increase the pressure in the annulus 95 and/or the measured annular pressure. Thus, the pressure increasing device 1500 creates multiple independent overbalance events, with each overbalance event in response to information received by the controller 110.

Figure 16:
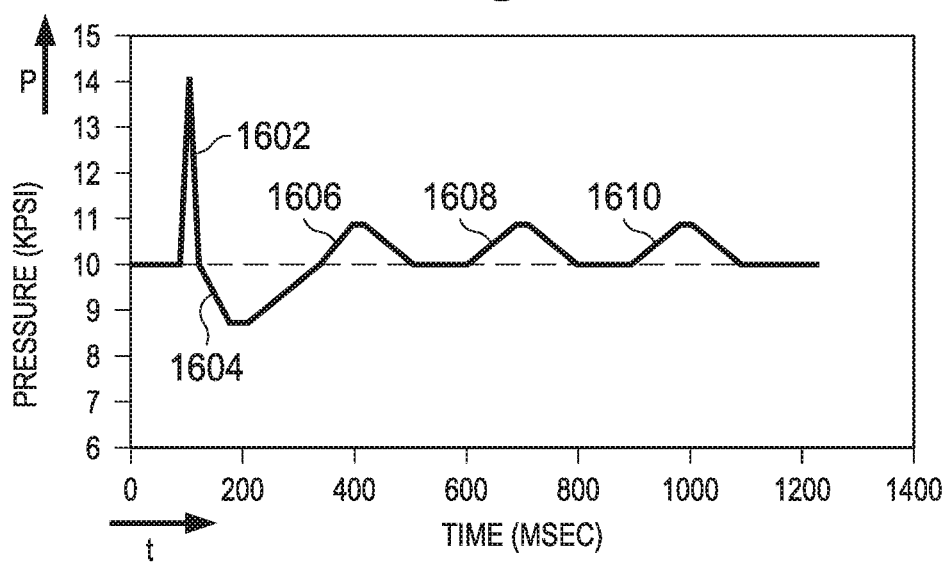
FIG. 16 is a graph illustrating a time-pressure profile created by the portion of the assembly of FIG. 15, according to an exemplary embodiment of the present disclosure.

FIG. 16 is a graph generally referred to by the reference numeral 1600 that illustrates a time-pressure profile resulting from the operation of the assembly 90 when the assembly 90 includes the pressure increasing device 1500. The time-pressure profile includes a first pressure overbalance 1602 associated with the firing of the perforation gun 125; a first pressure underbalance 1604; a second pressure overbalance 1606; a third pressure overbalance 1608; and a fourth pressure overbalance 1610. While the first pressure overbalance 1602 is associated with firing the perforation gun 125 and the first underbalance pressure 1604 is associated with the wellbore fluid entering chambers or voids in the perforation gun 125 after the perforating event, the second, third, and fourth pressure overbalances 1606, 1608, and 1610 are created by the ignition of the energetic material in the second, third, and fourth segments 1504*b*, 1504*c*, and 1504*d*, respectively. As shown in FIG. 16, the second, third, and fourth pressure overbalances 1606, 1608, and 1610 may be spaced to aid in unclogging any residual debris in the perforation tunnels.

FIG. 17 illustrates a portion of yet another embodiment of the assembly 90. The yet another embodiment of the assembly 90 includes the sensor system 105, the controller 110, and another embodiment of the pressure increasing device 1500 that generally referred to by the numeral 1700. The pressure increasing device 1700 includes a tubular 1702 forming a chamber 1704 that accommodates the energetic material. Again, the energetic material may take the form of one module, or, as depicted in FIG. 17, a plurality of modules 1706. Each of the plurality of modules 1706 may be separately controlled by the controller 110. For example, the controller 110 may send a signal to each of the plurality of modules 1706 to ignite each module. The tubular 1702 is substantially similar to the tubular 901, such that the tubular 1702 also has a plurality of ports 1707*a* and 1707*b* that extend through a wall of the tubular 1702. However, the tubular 1702 is not divided into segments by blow-out valves. The pressure increasing device 1700 also includes a valve system 1708 that is identical to the valve system 904, except that the valve system 1708 is in fluid communication with the chamber 1704. As shown in FIG. 17, the valve system 1708 extends in, or at least partially forms a portion of, the chamber 1704. As such, the valve system 1708 is configured to open and close in the same manner as the valve system 904 in the tubular 901. In operation, the valve system 1708 is momentarily opened to correspond with the ignition of each module in the plurality of modules 1706 or at least a portion of the plurality of modules 1706 and then closed to prevent the fluids from the annulus 95 from entering into the chamber 1704. In some embodiments, preventing the fluid from entering the chamber 1704 prevents a localized pressure underbalance pressure from occurring and/or prevents the remaining modules in the plurality of modules 1706 from contacting the fluid from the annulus 95. Thus, the remaining plurality of modules 1706 are preserved for later use. This closure of the valve system 1708 also allows gas(es) within the chamber 1704 (from the ignition of the energetic material) to cool and drop in pressure while allowing the pressure in the annulus 95 or the measured annular pressure to recover from the pressure overbalance event. After allowing the gas(es) to cool and the measured annular pressure to recover, the valve system 1708 is opened to allow the fluid in the annulus 95 to enter the chamber 1704, thereby creating a pressure underbalance event.

Figure 18:
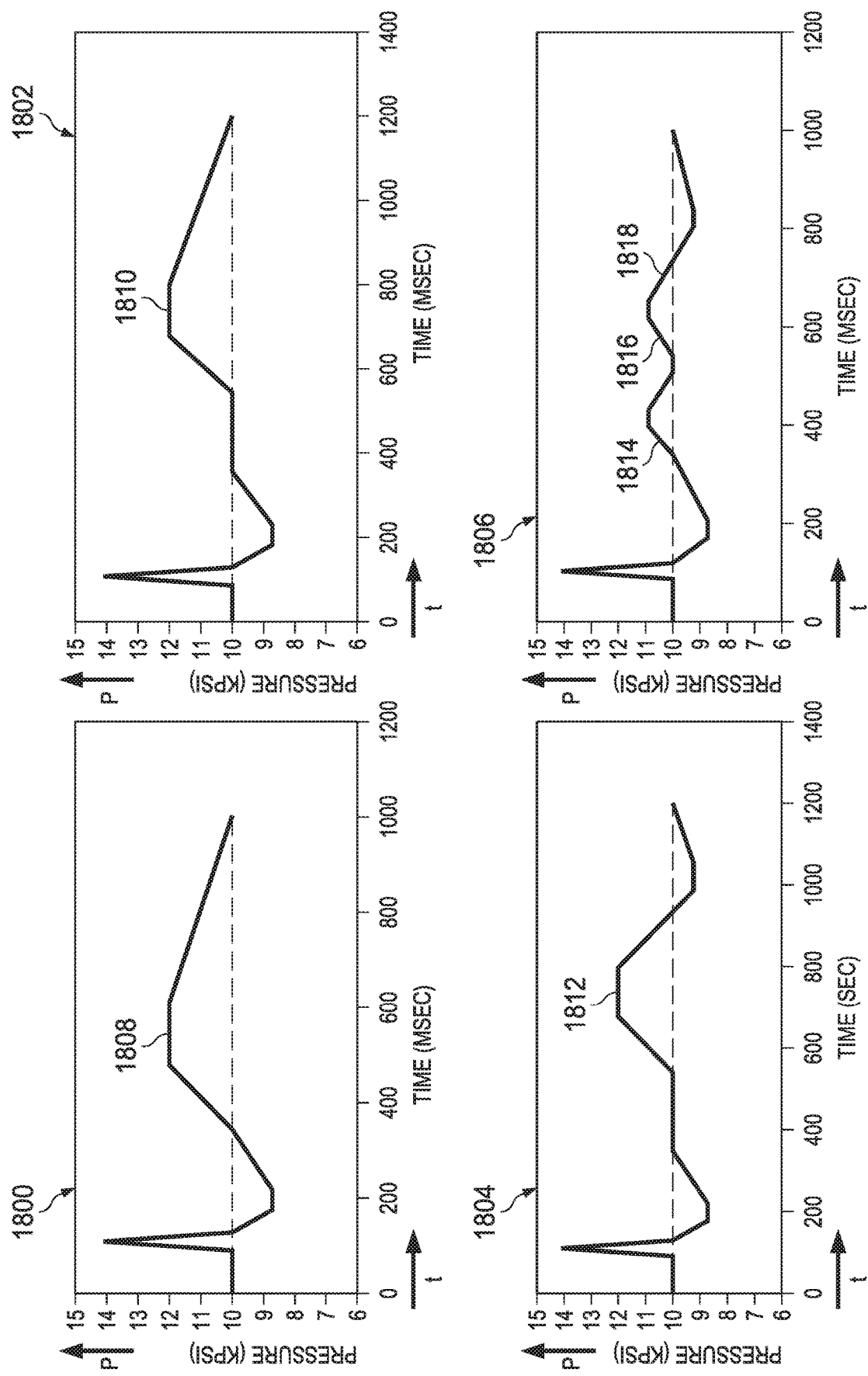
FIG. 18 includes graphs illustrating time-pressure profiles created by the portion of the assembly of FIG. 17, according to an exemplary embodiment of the present disclosure.

FIG. 18 includes a graph generally referred to by the reference numeral 1800; a graph generally referred to by the reference numeral 1802; a graph generally referred to by the reference numeral 1804; and a graph generally referred to by the reference numeral 1806, with each graph illustrating a time-pressure profile resulting from the operation of the assembly 90 when the assembly 90 includes the pressure increasing device 1700. As illustrated in graphs 1800, 1802, and 1804 an overbalance event 1808, 1810, and 1812, respectively, is extended due to the closure of the valve system 1708 prior to the fluid from the annulus 95 entering the chamber 1704. As illustrated in graph 1806, a first overbalance event 1814 and a second overbalance event 1816 may be generated by momentarily opening the valve system 1708 during the ignition of a first portion of the energetic material stored within the chamber 1704, quick closure of the valve system 1708 to prevent the fluid from the annulus 95 from entering the chamber 1704, followed by momentarily opening the valve system 1708 during the ignition of the remaining portion of the energetic material stored within the chamber 1704. The underbalance event 1818 is then created by allowing the fluid from the annulus 95 to enter the chamber 1704.

Figure 19A:
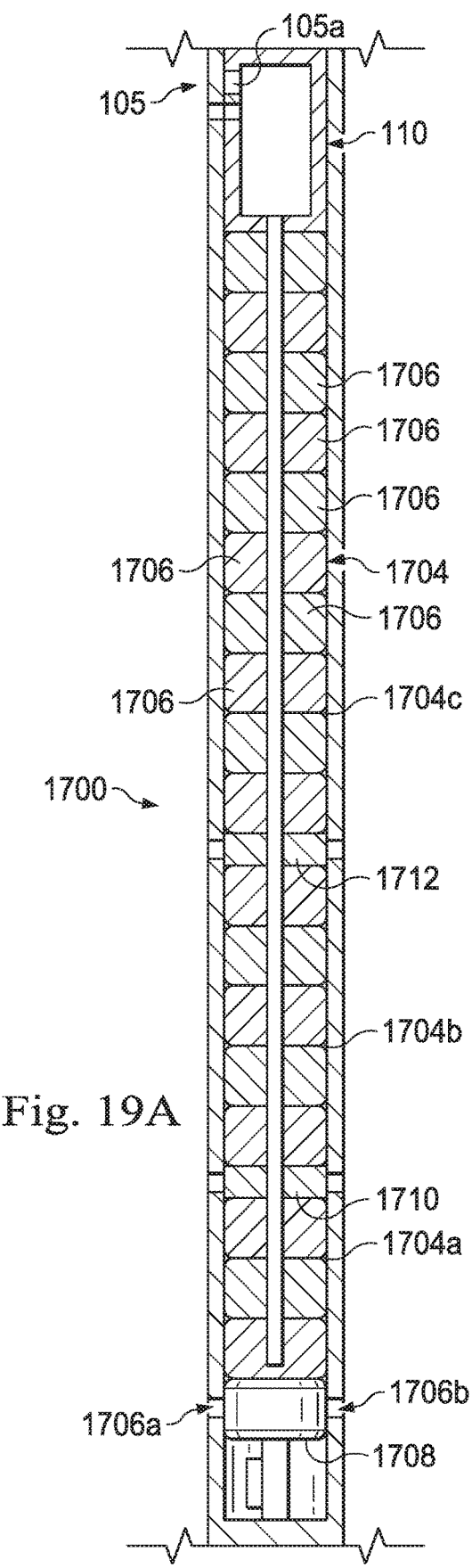
FIG. 19A is a schematic illustration of another embodiment of the portion of the assembly of FIG. 17 in a first configuration, according to an exemplary embodiment of the present disclosure.
Figure 19B:
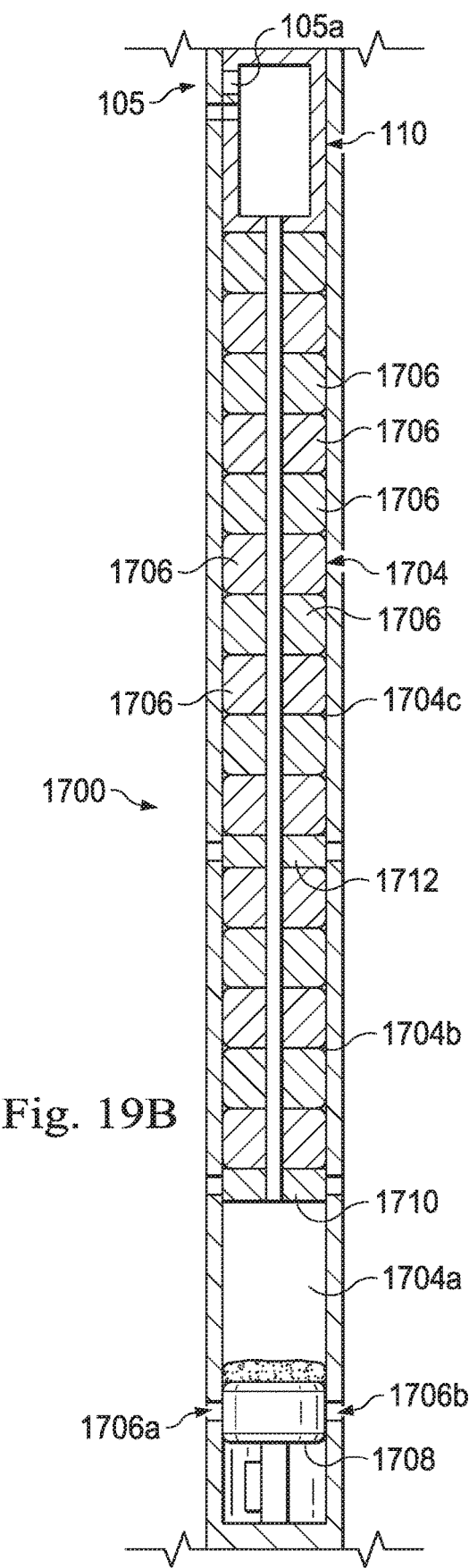
FIG. 19B is a schematic illustration of the portion of the assembly of FIG. 19A in a second configuration, according to an exemplary embodiment of the present disclosure.

FIGS. 19A and 19B illustrate a portion of yet another embodiment of the assembly 90. The yet another embodiment of the assembly 90 includes the sensor system 105, the controller 110, and another embodiment of the pressure increasing device 1700 that generally referred to by the numeral 1900. The pressure increasing device 1900 is substantially similar to the pressure increasing device 1700 except that the pressure increasing device includes a first valve 1710 and a second valve 1712 that fluidically isolate a first segment 1704*a* of the chamber 1704 from a second segment 1704*b* of the chamber 1704 and the second segment 1704*b* of the chamber 1704 from a third segment 1704*c* of the chamber 1704. The valves 1710 and 1712 may be blow-out valves. FIG. 19A illustrates the portion of the assembly 90 in a first configuration in which the energetic material is accommodated in each of the segments 1704*a*, 1704*b*, and 1704*c* and the valve system 1708 is in the closed state. In operation, the valve system 1708 is momentarily opened to correspond with the ignition of the energetic material in the first segment 1704*a* and then closed. FIG. 19B illustrates the portion of the assembly in a second configuration in which the valve system 1708 is in a closed state after the ignition of the energetic material in the segment 1704*a*. After this closure, the gas in the first segment 1704*a* cools to reduce pressure within the first segment 1704*a*. After the gas cools in the first segment 1704*a*, the valve system 1708 is opened to allow fluid from the annulus 95 to fill the first segment 1704*a* of the chamber 1704. The valve system 1708 may then be momentarily open to correspond with the ignition of the energetic material in the second segment 1704*b* and then closed to prevent the fluid from the annulus 95 from reentering the first segment 1704*a* and/or entering the second segment 1704*b*. Thus, by preventing fluid from entering the first and second segments 1704*a* and 1704*b*, a pressure underbalance event is prevented or at least delayed. A similar sequence occurs for the third segment 1704*c*. However, the energetic material in first segment 1704*a*, the second segment 1704*b*, and the third segment 1704*c* may be ignited simultaneously instead of providing a delay between the ignition of each.

Figure 20:
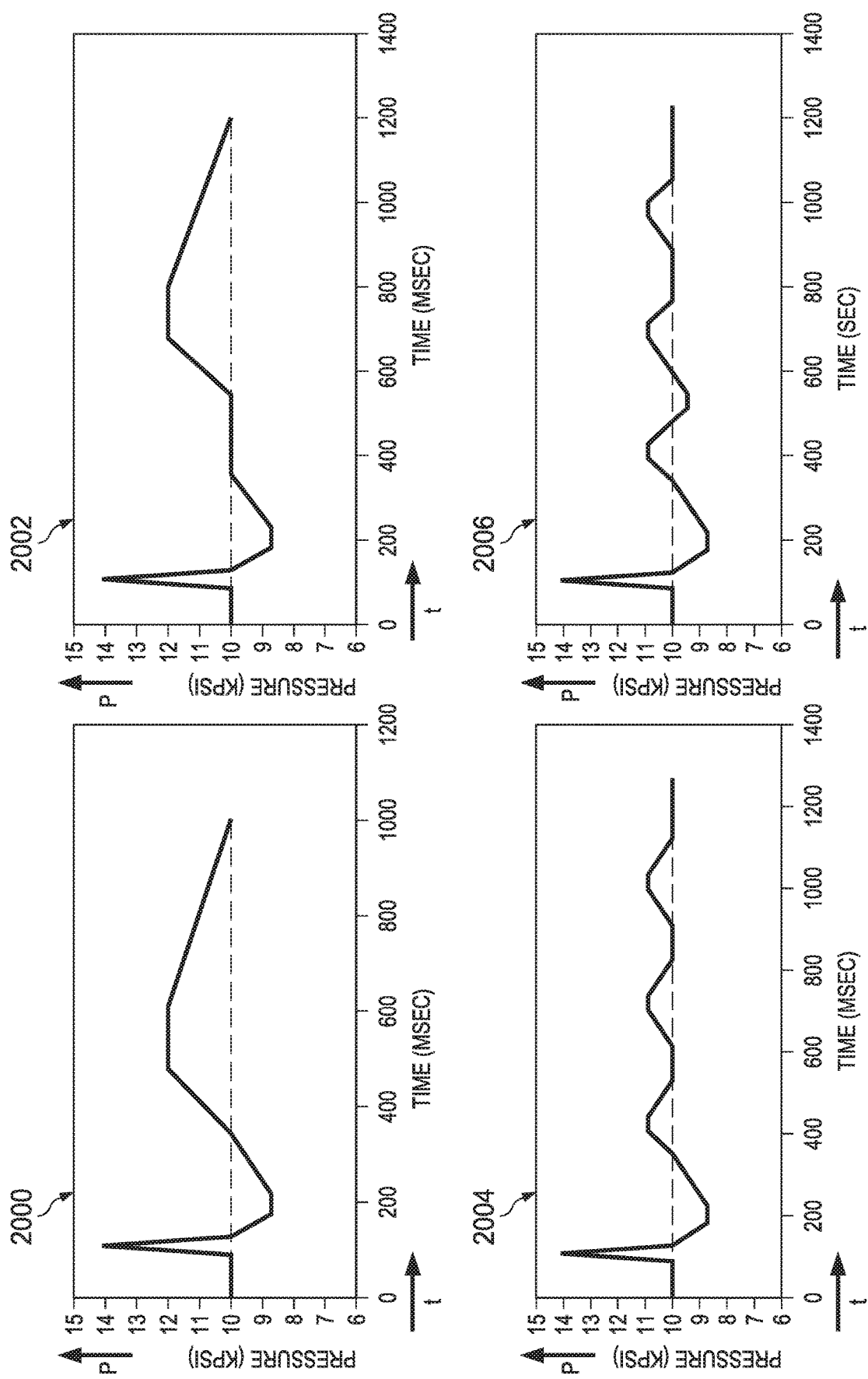
FIG. 20 are graphs illustrating time-pressure profiles created by the portion of the assembly of FIG. 19, according to an exemplary embodiment of the present disclosure.

FIG. 20 includes a graph generally referred to by the reference numeral 2000; a graph generally referred to by the reference numeral 2002; a graph generally referred to by the reference numeral 2004; and a graph generally referred to by the reference numeral 2006, with each graph illustrating a time-pressure profile resulting from the operation of the assembly 90 when the assembly 90 includes the pressure increasing device 1900.

In another embodiment of the pressure increasing device 1900, the first segment 1704a does not include the energetic material and thus, the pressure increasing device 120 is both a pressure decreasing device 130 and a pressure increasing device. That is, opening of the valve system 1708 allows fluid from the annulus 95 to enter the first segment 1704a to reduce the wellbore pressure or measured annular pressure temporarily without ignition of an energetic material within the first segment 1704a.

Figure 21:
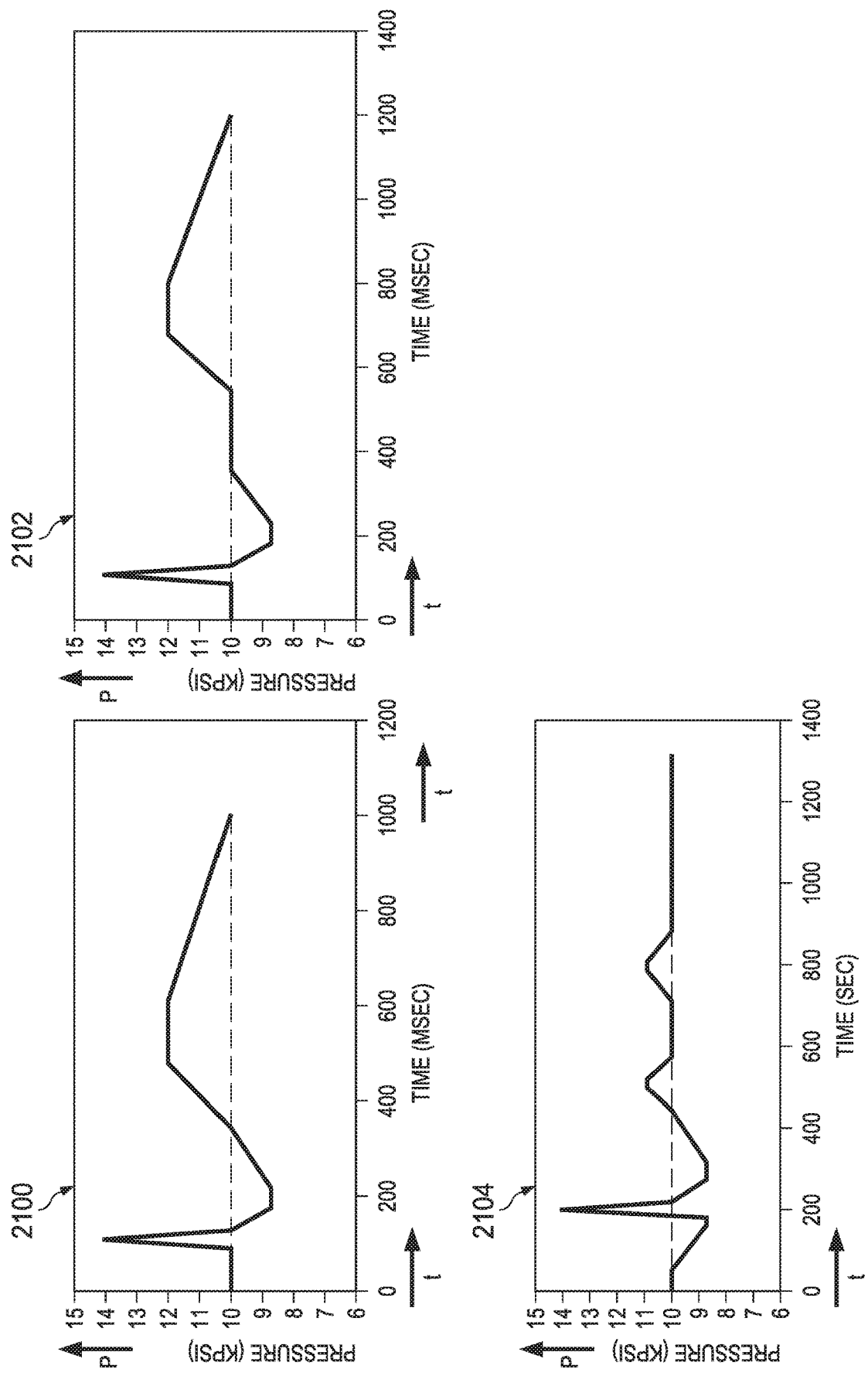
FIG. 21 are graphs illustrating time-pressure profiles created by another embodiment of the portion of the assembly of FIG. 19, according to an exemplary embodiment of the present disclosure.

FIG. 21 includes a graph generally referred to by the reference numeral 2100; a graph generally referred to by the reference numeral 2102; a graph generally referred to by the reference numeral 2104; and a graph generally referred to by the reference numeral 2106, with each graph illustrating a time-pressure profile resulting from the operation of the assembly 90 when the assembly 90 includes the pressure increasing device 1900 that does not include energetic material accommodated within the first segment 1704a of the chamber 1704.

A variety of alterations are contemplated here. For example, while the pressure increasing devices 1500 and 1900 are illustrated as having three segments that form the chamber, any number of valves may segment the chambers 1504 and 1904 into any number of segments. Moreover, any variety of valve systems 906 and 1708 are contemplated here, such as rack and pinion valve systems and others. Additionally, each of the graphs 1200, 1300, 1400, 1600, 1800, 1802, 1804, 1806, 2000, 2002, 2004, 2006, 2100, 2102, and 2104 is a reference time-pressure profile that is stored in the controller and that is used to control the operation of the assembly 90, a dynamic time-pressure profile that is associated with the perforation event and the assembly 90 and that substantially matches a reference profile, or a dynamic transient pressure profile that is associated with the perforation event and that substantially matches a reference profile.

In an exemplary embodiment, the method 185 and/or the use of the assembly 90 results in autonomous or "smart" control of the annular pressure during the perforating event. During the perforation event, the assembly 90 is capable of correcting and adjusting the annular pressure through the use of the PADs 115 to mirror the reference time-pressure profile. Thus, the assembly 90 is an active control assembly, considering it has control logic built in to mitigate any differences between the actual outcome (measured parameter input by the sensor 105a) and the goal or reference (parameter provided in the reference time-pressure profile). The method 185 and/or the use of the assembly 90 may result in increased production of hydrocarbons from the formation 20. Additionally, the method 185 and/or the use of the assembly 90 may result in improved injectivity during well treatments and better sand control. The method 185 and/or the use of the assembly 90 also may maintain wellbore integrity and protects completion equipment. Additionally, the method 185 and/or the use of the assembly 90 maintain gun system integrity. The method 185 and/or the use of the assembly 90 may also be used to extend the length of the time during which the annular pressure is adjusted during a transient pressure profile associated with a perforation event. The method 185 and/or the use of the assembly 90 results in more efficient or effective "clean up" of the perforated formation because of the proximity of the pressure decreasing device 130 to the pressure increasing device 120. That is, the length of the assembly 90 in the longitudinal direction is more compact and allows for the pressure underbalance to be localized at, or at least closer to the location of the casing perforations. Generally, the effects on the formation 20 (i.e., pressure underbalances and pressure overbalances) resulting from the actuation of the pressure increasing device 120 and/or the pressure decreasing device 130 are reduced as the longitudinal spacing between the casing perforations and the pressure increasing device 120 and the pressure decreasing device 130 are increased. Thus, and due to the compact spacing of the assembly 90 due to the chambers 1504 1704 acting as the pressure increasing device 120 and the pressure decreasing device 130, the effects on the formation 20 are increased. Moreover, the ability to close the valve systems 904 and 1708 after opening the valve systems 904 and 1708 allows for the delay of the pressure underbalance that may be associated with the fluid in the annulus 95 from entering newly voids or chambers in the tubulars 1502 and 1702 that were previously unavailable prior to ignition of the energetic material in the chambers 1504 and 1704, respectively.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Thus, an apparatus for controlling the wellbore pressure within a wellbore using a valve system that can change state multiple times is provided. Embodiments of the apparatus may include receiving information generated about the wellbore pressure within the wellbore; changing a state of the valve system, which is positioned relative to a chamber within the wellbore, multiple times based on the information received to create a plurality of pressure conditions that substantially match a reference pressure profile, wherein each of the plurality of pressure conditions is selected from one of an underbalance condition and an overbalance condition. For any of the foregoing embodiments, the method may include any one of the following elements, alone or in combination with each other:

Changing the state of the valve system comprises moving the valve system from a closed state to an open state; and moving the valve system from an open state to a closed state.

Changing the state of the valve system comprises actuating a first actuator of an actuator system to move the valve system from a first state into a second state; and actuating a second actuator of the actuator system to move the valve system from the second state into the first state.

Changing the state of the valve system comprises sending a first signal to a first pyrotechnic actuator to actuate the first pyrotechnic actuator to move the valve system from a first state into a second state; and sending a second signal to a second pyrotechnic actuator to actuate the second pyrotechnic actuator to move the valve system from the second state into the first state.

Identifying a current wellbore pressure using the information received.

Building a dynamic pressure profile for the wellbore pressure using the current wellbore pressure.

Controlling a pressure increasing device to increase the wellbore pressure based on the information about the wellbore pressure.

Controlling the pressure increasing device comprises igniting energetic material contained within at least one module within the chamber to increase the wellbore pressure.

Changing the state of the valve system comprises changing the state of the valve system multiple times to build a dynamic pressure profile for the wellbore pressure that includes one of multiple dynamic overbalance conditions, multiple dynamic underbalance conditions, and a combination of dynamic overbalance conditions and dynamic underbalance conditions.

Thus, a method of controlling wellbore pressure within a wellbore during a perforation event is provided. Embodiments of the method may include receiving information generated about the wellbore pressure within the wellbore; and changing a state of a valve system, positioned relative to a chamber within the wellbore, multiple times based on the information received to create a plurality of pressure conditions that substantially match a reference pressure profile, wherein each of the plurality of pressure conditions is selected from one of an underbalance condition and an overbalance condition. For any of the foregoing embodiments, the method may include any one of the following elements, alone or in combination with each other:

Changing the state of the valve system includes moving the valve system from a closed state to an open state; and moving the valve system from an open state to a closed state.

Changing the state of the valve system includes actuating a first actuator of an actuator system to move the valve system from a first state into a second state; and actuating a second actuator of the actuator system to move the valve system from the second state into the first state.

Changing the state of the valve system includes sending a first signal to a first pyrotechnic actuator to actuate the first pyrotechnic actuator to move the valve system from a first state into a second state; and sending a second signal to a second pyrotechnic actuator to actuate the second pyrotechnic actuator to move the valve system from the second state into the first state.

Identifying a current wellbore pressure using the information received.

Building a dynamic pressure profile for the wellbore pressure using the current wellbore pressure.

Controlling a pressure increasing device to increase the wellbore pressure based on the information about the wellbore pressure.

Controlling the pressure increasing device includes igniting energetic material contained within at least one module within the chamber to increase the wellbore pressure.

Changing the state of the valve system includes changing the state of the valve system multiple times to build a dynamic pressure profile for the wellbore pressure that includes one of multiple dynamic overbalance conditions, multiple dynamic underbalance conditions, and a combination of dynamic overbalance conditions and dynamic underbalance conditions.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

What is claimed is:

1. An apparatus for controlling wellbore pressure within a wellbore during a perforation event, the apparatus comprising:
    a tubular defining a chamber;
    a valve system in fluid communication with the chamber, wherein the valve system selectively places the chamber in communication with the wellbore;
    energetic material accommodated within the chamber; and
    a controller operably coupled to the valve system, wherein the controller receives information generated about the wellbore pressure within the wellbore and controls changing a state of the valve system based on the information to create a plurality of pressure conditions based on a reference pressure profile;
    wherein the apparatus is moveable between a first configuration, a second configuration, and a third configuration;
    wherein, when in the first configuration, the energetic material is accommodated within the chamber and the valve system is in a closed state such that the chamber is fluidically isolated from the wellbore;
    wherein, when in the second configuration, the valve system is in an open state such that gas produced from ignition of the energetic material exits the chamber and passes to the wellbore to produce an overbalance condition in the wellbore;
    wherein, when in the third configuration, the valve system is in the closed state and a portion of the gas produced from the ignition of the energetic material remains in the chamber and the chamber is fluidically isolated from the wellbore; and
    wherein the apparatus is configured to move from the second configuration to the third configuration prior to allowing wellbore fluid to enter the chamber.

2. The apparatus of claim 1, wherein the controller controls the valve system to move the apparatus from the first configuration into the second configuration and controls the valve system to move the apparatus from the second configuration into the third configuration.

3. The apparatus of claim 1, wherein the valve system comprises:
    an actuation system controlled by the controller to change the state of the valve system multiple times based on the information.

4. The apparatus of claim 1, wherein the valve system comprises:
    a first pyrotechnic actuator that actuates in response to receiving a first signal from the controller to move the valve system from the closed state to the open state; and a second pyrotechnic actuator that actuates in response to receiving a second signal from the controller to move the valve system from the open state back to the closed state.

5. The apparatus of claim 1, wherein the valve system comprises:
an actuation system that includes a first actuator and a second actuator; and
a rotatable valve body that moves in a first rotational direction in response to actuation of the first actuator and in a second rotational direction in response to actuation of the second actuator,
wherein movement of the rotatable valve body in the first rotational direction changes the state of the valve system from the closed state to the open state; and
wherein movement of the rotatable valve body in the second rotational direction changes the state of the valve system from the open state to the closed state.

6. The apparatus of claim 1, wherein the valve system comprises another tubular defining an interior passageway that is in fluid communication with the chamber, wherein a port extends through a wall of the another tubular and is fluidly connected to the wellbore and the interior passageway when the valve system is in the open state and that is not fluidly connected to the wellbore when the valve system is in the closed state.

7. The apparatus of claim 1 further comprising:
a sensor system that generates the information about the wellbore, wherein the sensor system, the controller, and the valve system form a feedback control loop.

8. The apparatus of claim 7, wherein the sensor system comprises:
a pressure sensor that measures the wellbore pressure.

9. The apparatus of claim 1, wherein the reference pressure profile is one of a reference time-dependent pressure profile and a reference time-independent pressure profile.

10. A method of controlling wellbore pressure within a wellbore during a perforation event, the method comprising:
positioning a tool within the wellbore, wherein the tool comprises:
a tubular defining a chamber;
a valve system that selectively places the chamber in communication with the wellbore; and
energetic material accommodated within the chamber;
receiving information generated about the wellbore pressure within the wellbore;
changing a state of the valve system from a closed state to an open state to allow gas produced from ignition of the energetic material to exit the chamber and enter the wellbore; and
changing, after at least a portion of the gas produced from the ignition of the energetic material exits the chamber, the state of the valve system from the open state to the closed state prior to allowing wellbore fluid to enter the chamber;
wherein changing the state of the valve is in response to information received to create a plurality of pressure conditions; and
wherein the plurality of pressure conditions is based on a reference pressure profile.

11. The method of claim 10,
wherein changing the state of the valve system from the closed state to the open state comprises actuating a first actuator of an actuator system to move the valve system from the closed state to the open state; and
wherein changing the state of the valve system from the open state to the closed state comprises actuating a second actuator of the actuator system to move the valve system from the open state to the closed state.

12. The method of claim 10,
wherein changing the state of the valve system from the closed state to the open state comprises sending a first signal to a first pyrotechnic actuator to actuate the first pyrotechnic actuator to move the valve system from the closed state to the open state; and
wherein changing the state of the valve system from the open state to the closed state comprises sending a second signal to a second pyrotechnic actuator to actuate the second pyrotechnic actuator to move the valve system from the open state to the closed state.

13. The method of claim 10 further comprising:
identifying a current wellbore pressure using the information received; and
building a dynamic pressure profile for the wellbore pressure using the current wellbore pressure.

14. The method of claim 10, further comprising:
igniting, based on the information about the wellbore pressure, the energetic material that is accommodated within the chamber.

15. The method of claim 10, further comprising changing the state of the valve system multiple times to build a dynamic pressure profile for the wellbore pressure that includes one of multiple dynamic overbalance conditions, multiple dynamic underbalance conditions, and a combination of dynamic overbalance conditions and dynamic underbalance conditions.

16. The method of claim 10, further comprising, after changing the state of the valve system from the open state to the closed state, opening the valve system to allow fluid within the wellbore to enter the chamber.

* * * * *